US012742712B2

(12) United States Patent
Goto et al.

(10) Patent No.: US 12,742,712 B2
(45) Date of Patent: Sep. 22, 2026

(54) DIAGNOSTIC METHOD AND DIAGNOSTIC APPARATUS

(71) Applicant: KABUSHIKI KAISHA TOSHIBA, Tokyo (JP)

(72) Inventors: Tatsuhiko Goto, Kawasaki (JP); Osamu Nishimura, Kawasaki (JP); Akihiko Enamito, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1158 days.

(21) Appl. No.: 17/652,126

(22) Filed: Feb. 23, 2022

(65) Prior Publication Data

US 2023/0086637 A1 Mar. 23, 2023

(30) Foreign Application Priority Data

Sep. 17, 2021 (JP) ................................ 2021-152422

(51) Int. Cl.
*G01N 3/34* (2006.01)

(52) U.S. Cl.
CPC ....... *G01N 3/34* (2013.01); *G01N 2203/0039* (2013.01); *G01N 2203/0206* (2013.01); *G01N 2203/021* (2013.01)

(58) Field of Classification Search
CPC ............ G01N 3/34; G01N 2203/0039; G01N 2203/0206; G01N 2203/021; G01H 13/00; G01H 1/00
USPC ........................................................ 73/808
See application file for complete search history.

(56) References Cited

U.S. PATENT DOCUMENTS

| | | | |
|---|---|---|---|
| 2008/0025521 A1 | 1/2008 | Morise et al. | |
| 2018/0103319 A1 | 4/2018 | Stein et al. | |

FOREIGN PATENT DOCUMENTS

| | | | |
|---|---|---|---|
| CN | 104729816 A * | 6/2015 | |
| CN | 111241721 A * | 6/2020 | ............... B21B 3/00 |
| EP | 3851825 A1 * | 7/2021 | ............ G01M 7/025 |
| JP | 53-135358 A | 11/1978 | |
| JP | 60-211326 A | 10/1985 | |

(Continued)

OTHER PUBLICATIONS

Haitao Zheng et al., Integrity Testing of Cast In Situ Concrete Piles Based on an Impulse Response Function Method Using Sine-Sweep Excitation by a Shaker, 2019, Journal of Nondestructive Evaluation (2019) 38:55 (Year: 2019).*

(Continued)

*Primary Examiner* — Marrit Eyassu
(74) *Attorney, Agent, or Firm* — Oblon, McClelland, Maier & Neustadt, L.L.P.

(57) ABSTRACT

According to one embodiment, a diagnostic method includes changing a position of a mechanical structure to be diagnosed with a drive unit based on an acceleration command, the acceleration command being generated based on a log swept sine (LOGSS) signal, calculating an impulse response based on the acceleration command and measured acceleration of the mechanical structure, the measured acceleration being measured by an accelerometer, analyzing at least one of a linear characteristic and a nonlinear characteristic relating to the mechanical structure based on the impulse response, and diagnosing the mechanical structure based on the at least one of the linear characteristic and the nonlinear characteristic relating to the mechanical structure.

17 Claims, 31 Drawing Sheets

(56) References Cited

FOREIGN PATENT DOCUMENTS

| | | | |
|---|---|---|---|
| JP | 05-118906 | A | 5/1993 |
| JP | 5-224718 | A | 9/1993 |
| JP | 9-329184 | A | 12/1997 |
| JP | 2006-145515 | A | 6/2006 |
| JP | 2008-203224 | A | 9/2008 |
| JP | 2014-085439 | A | 5/2014 |
| JP | 2014-220589 | A | 11/2014 |
| JP | 2019-531037 | A | 10/2019 |
| JP | 2019-203912 | A | 11/2019 |
| WO | WO 2006/01 1356 | A1 | 2/2006 |

OTHER PUBLICATIONS

M.P. Limongelli et al., Damage detection in a post tensioned concrete beam—Experimental investigation, 2016, Engineering Structures 128 (2016) 15-25 (Year: 2016).*

Dennis Göge et al., "Experiences with dynamic load simulation by means of modal forces in the presence of structural non-linearities", Aerospace Science and Technology 10 (2006) pp. 411-419.

M.P. Limongelli et al., "Damage detection in a post tensioned concrete beam—Experimental investigation", Engineering Structures, 128, 2016, pp. 15-25.

T. Humbert et al., "Wave turbulence in vibrating plates the effect of damping", Europhysics Letters, vol. 102, No. 3, May 15, 2013, pp. 1-6.

Haitao Zeng et al., "Integrity Testing of Cast In Situ Concrete Piles Based on an Impulse Response Function Method Using Sine-Sweep Excitation by a Shaker", Journal of Nondestructive Evaluation (2019) 38:55, pp. 1-18.

European Office Action dated Jun. 24, 2026, issued in European Patent Application No. 22 158 497.2.

Angelo Farina. "Simultaneous measurement of impulse response and distortion with a swept-sine technique." Dipartimento di Ingegneria Industriale, Università di Parma, Via delle Scienze—43100 PARMA. Presented at the 108th Convention 2000, Feb. 19-22, Paris, France.

* cited by examiner

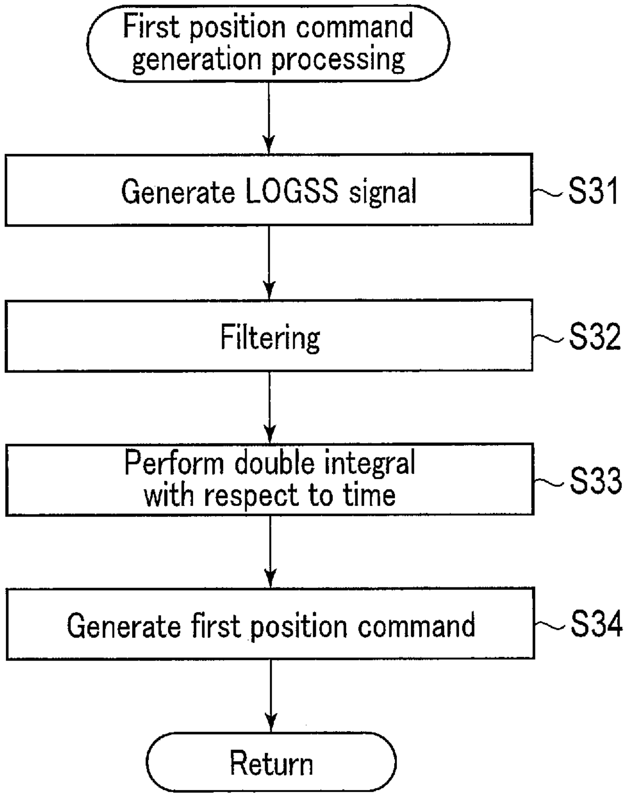
F I G. 3

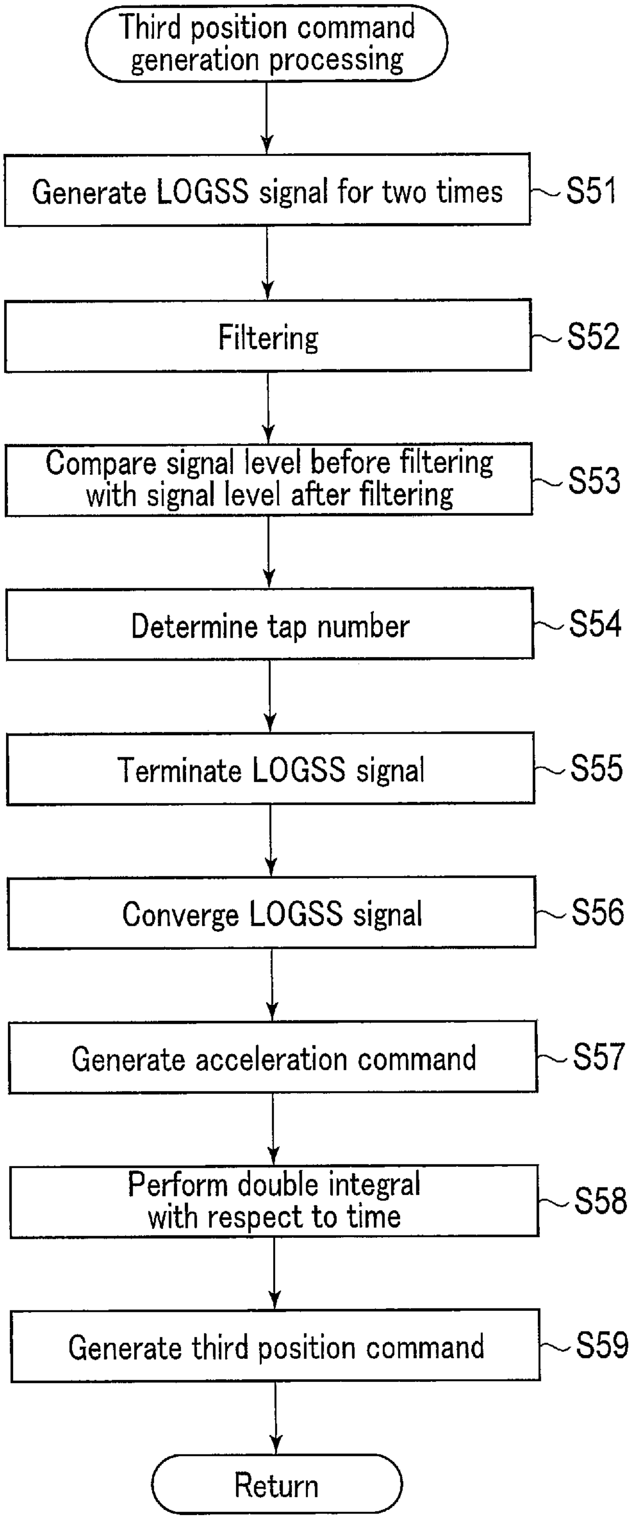
F I G. 5

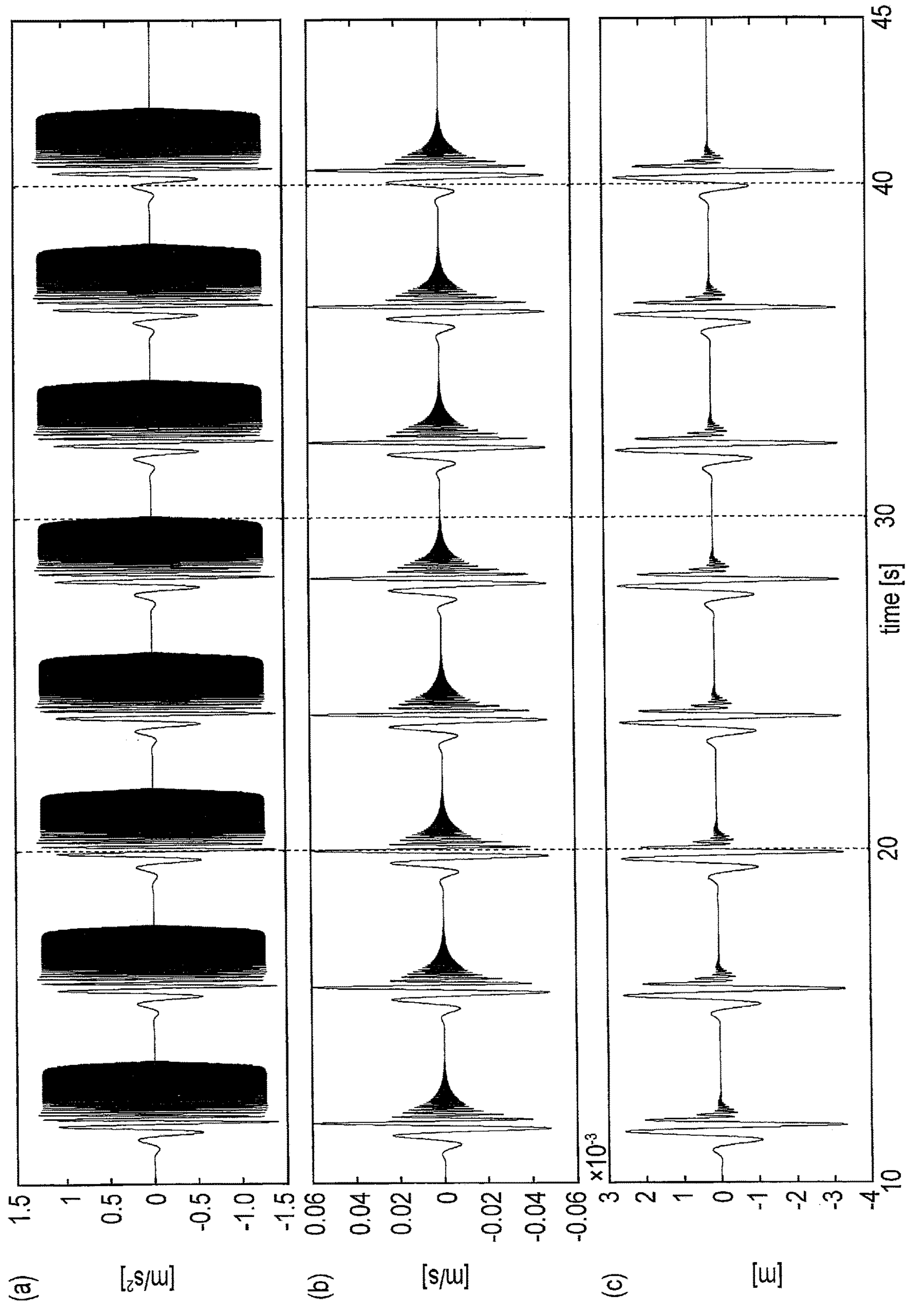
F I G. 6B

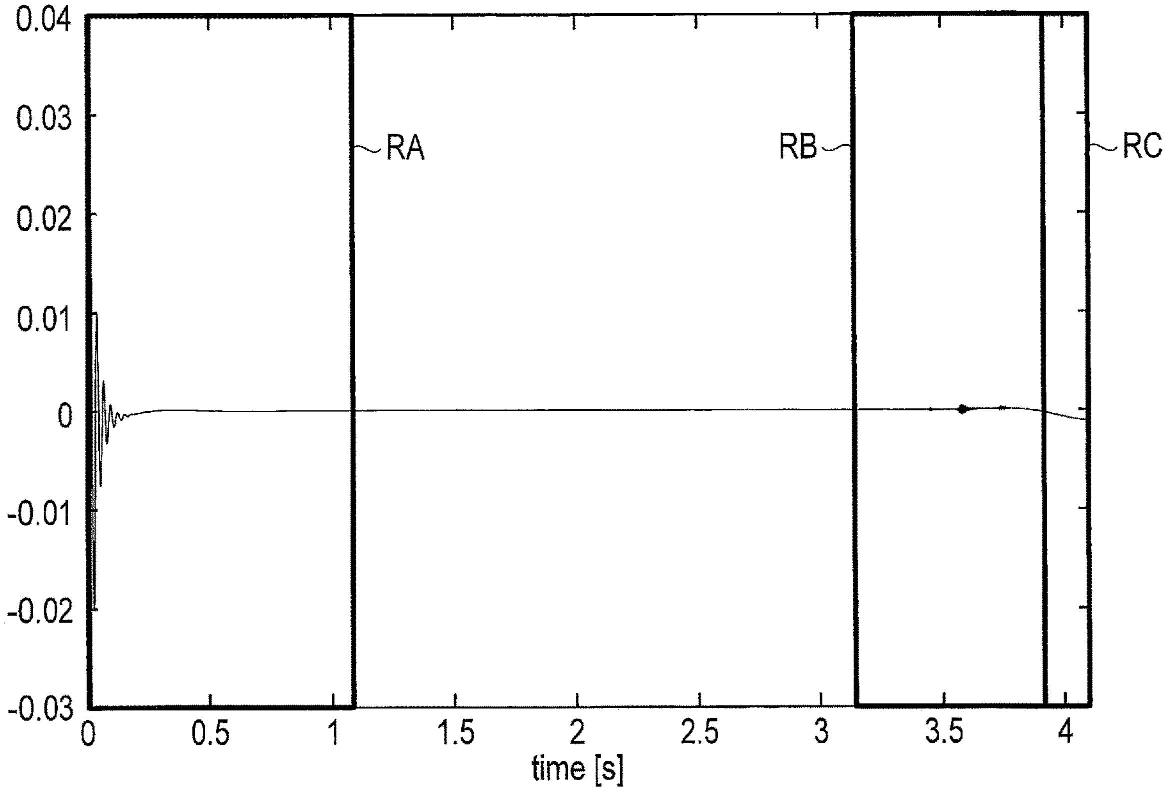
F I G. 7
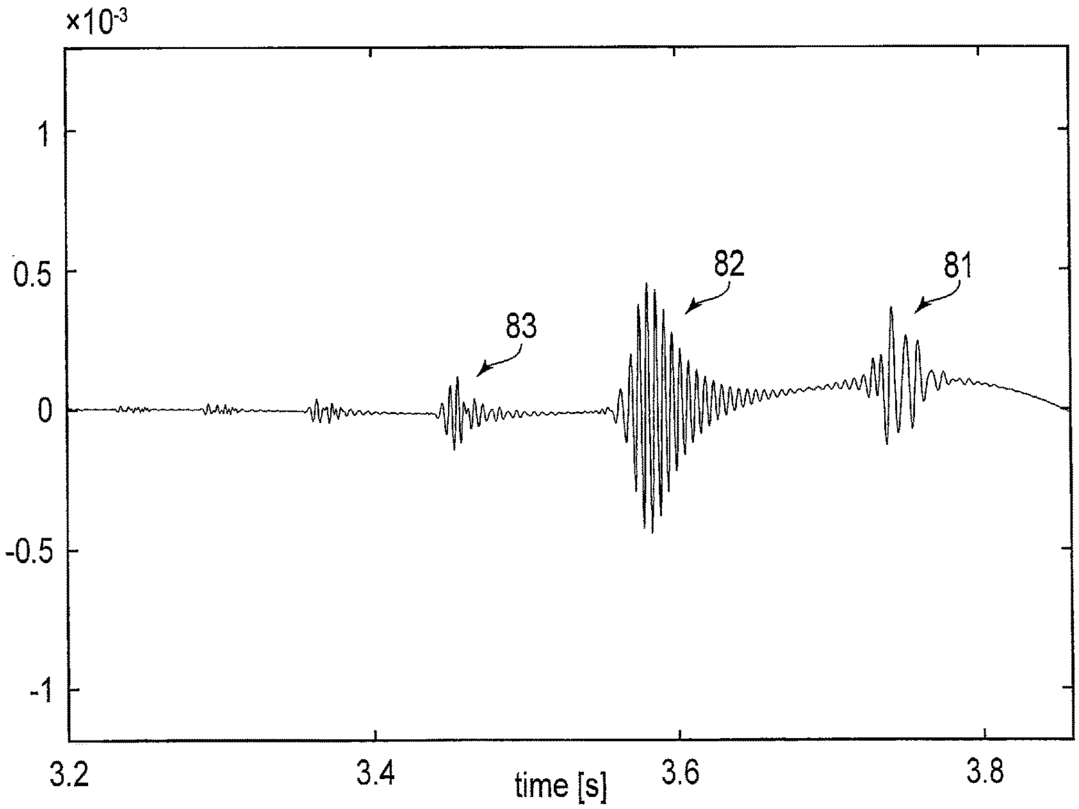
F I G. 8

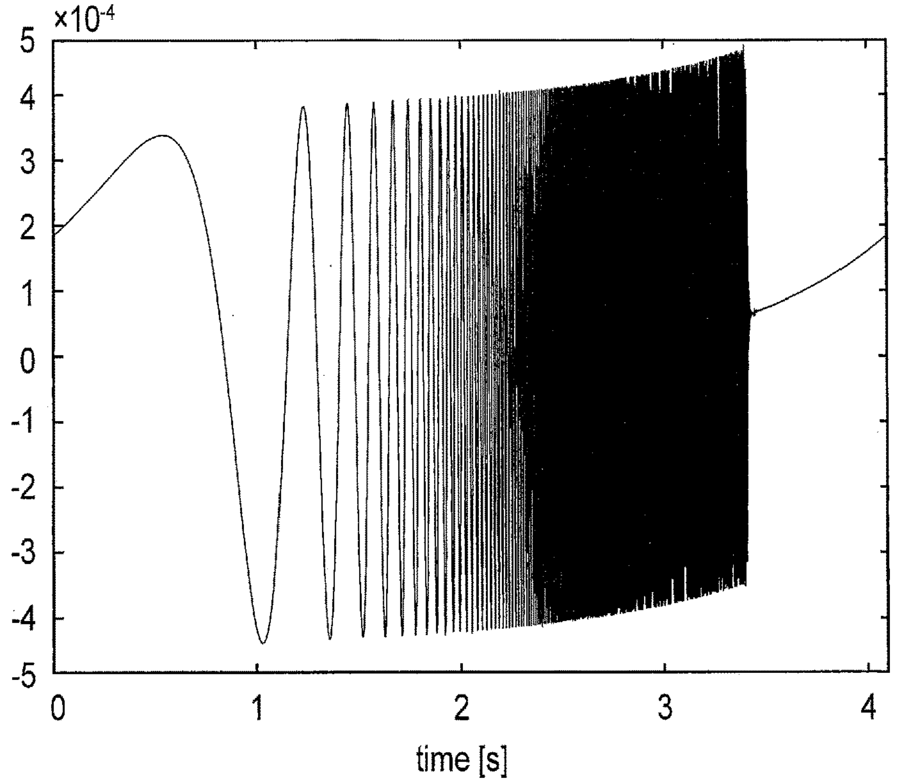
F I G. 8A
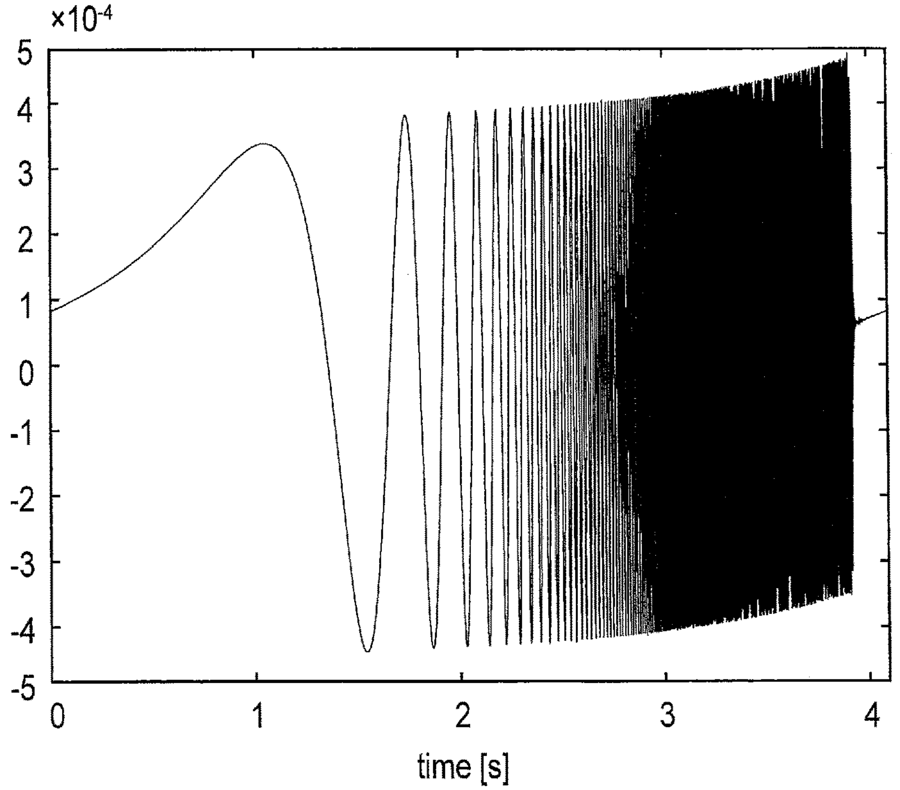
F I G. 8B

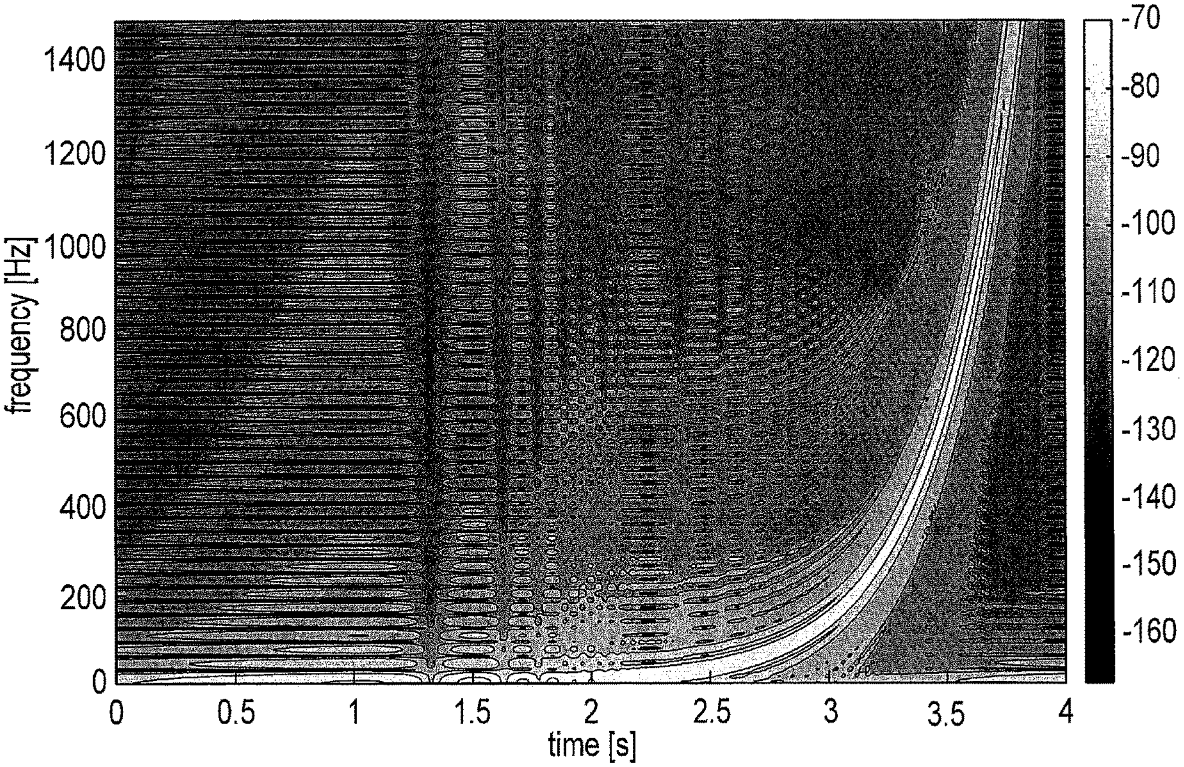
F I G. 8C
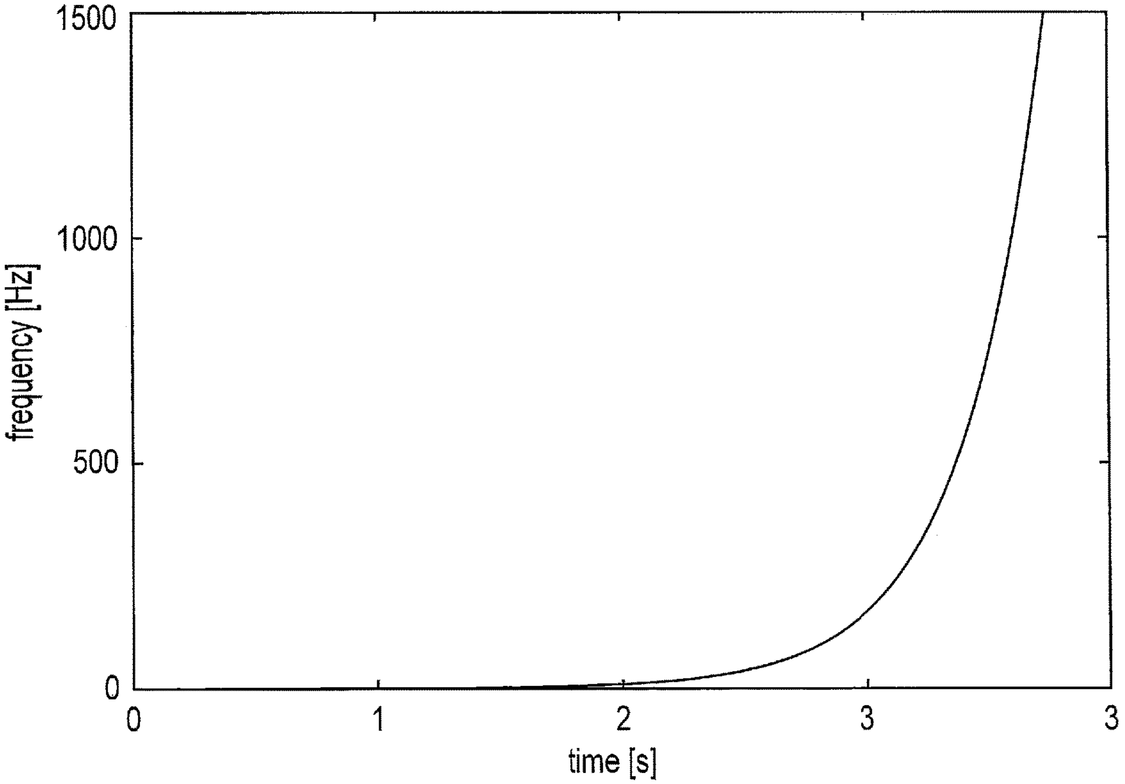
F I G. 8D

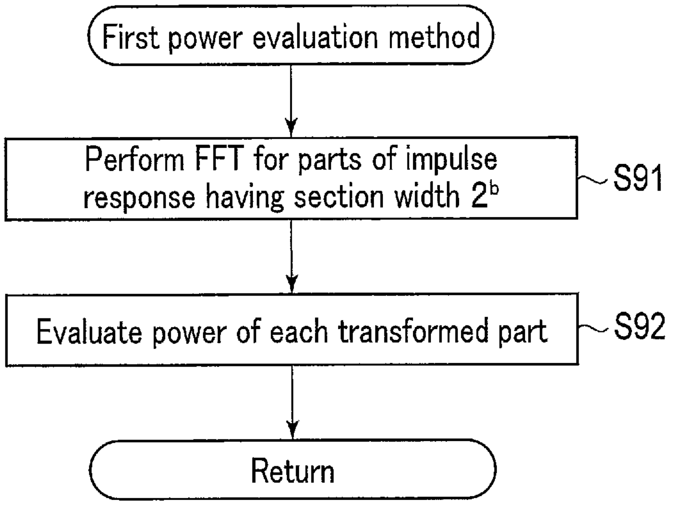
F I G. 9A
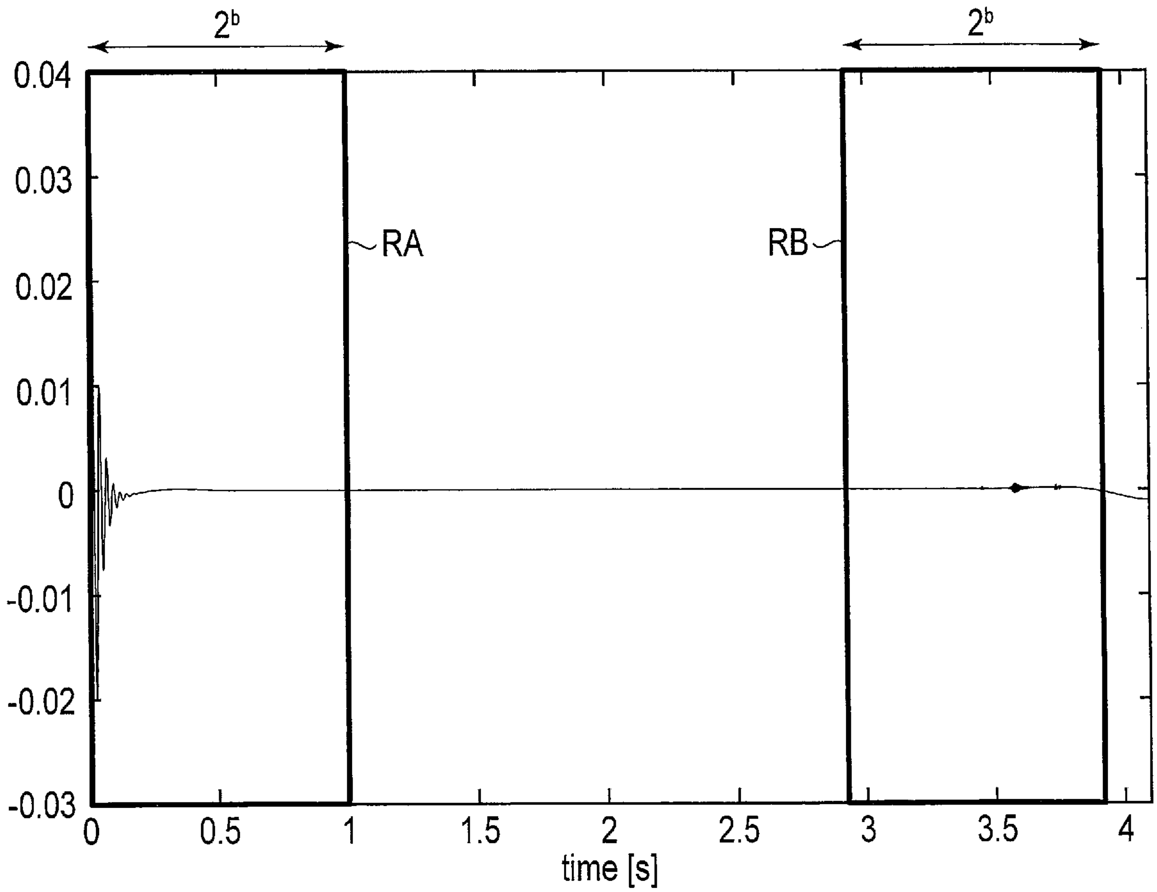
F I G. 9B

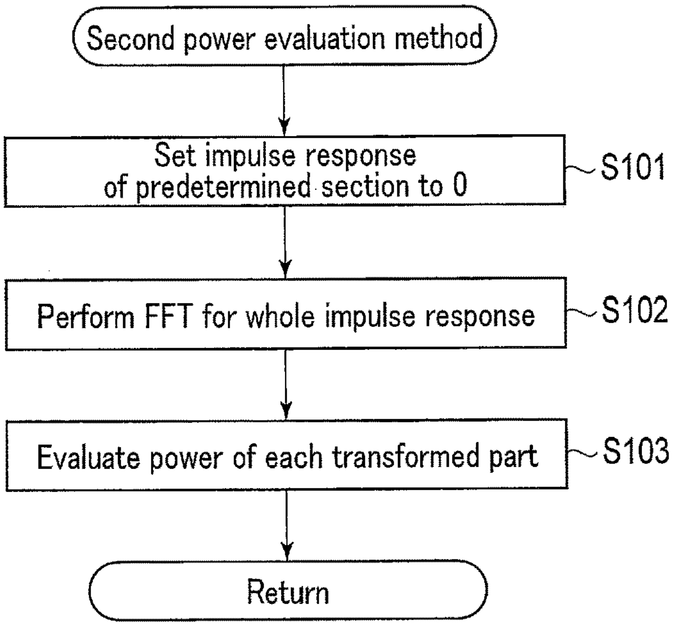
F I G. 10A
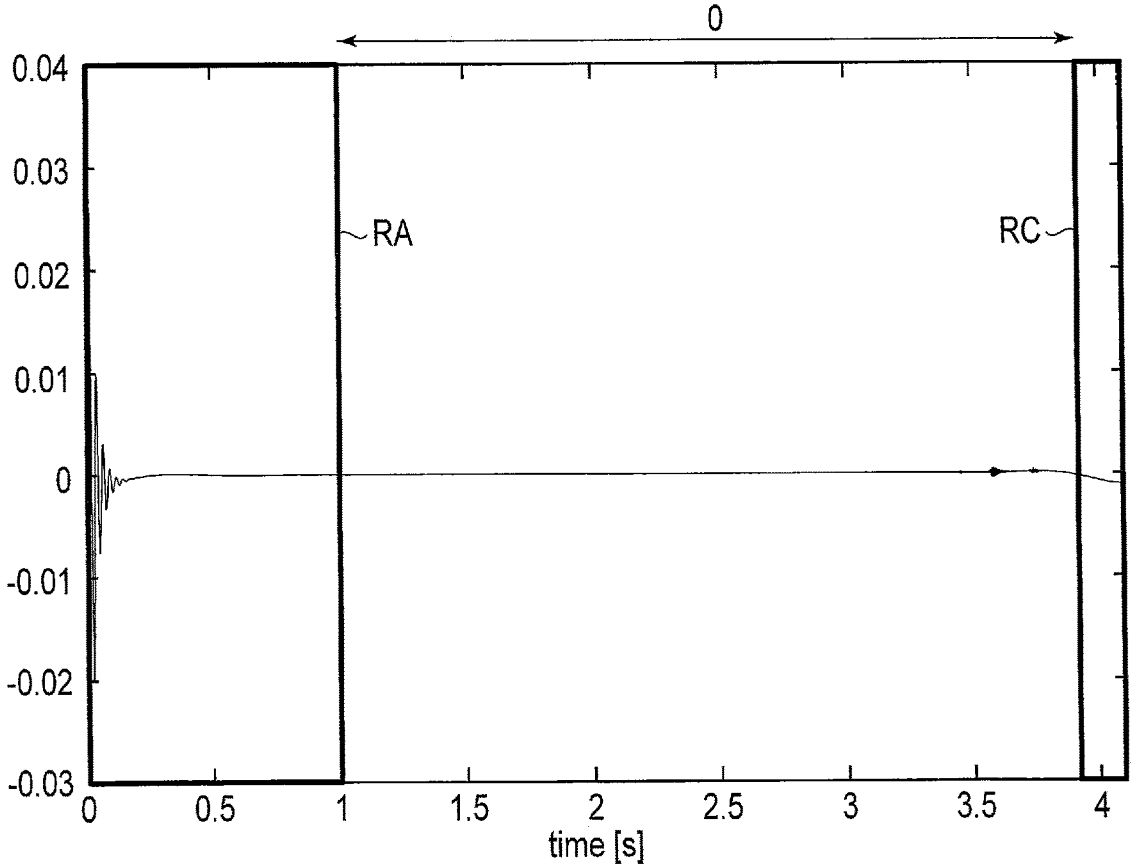
F I G. 10B

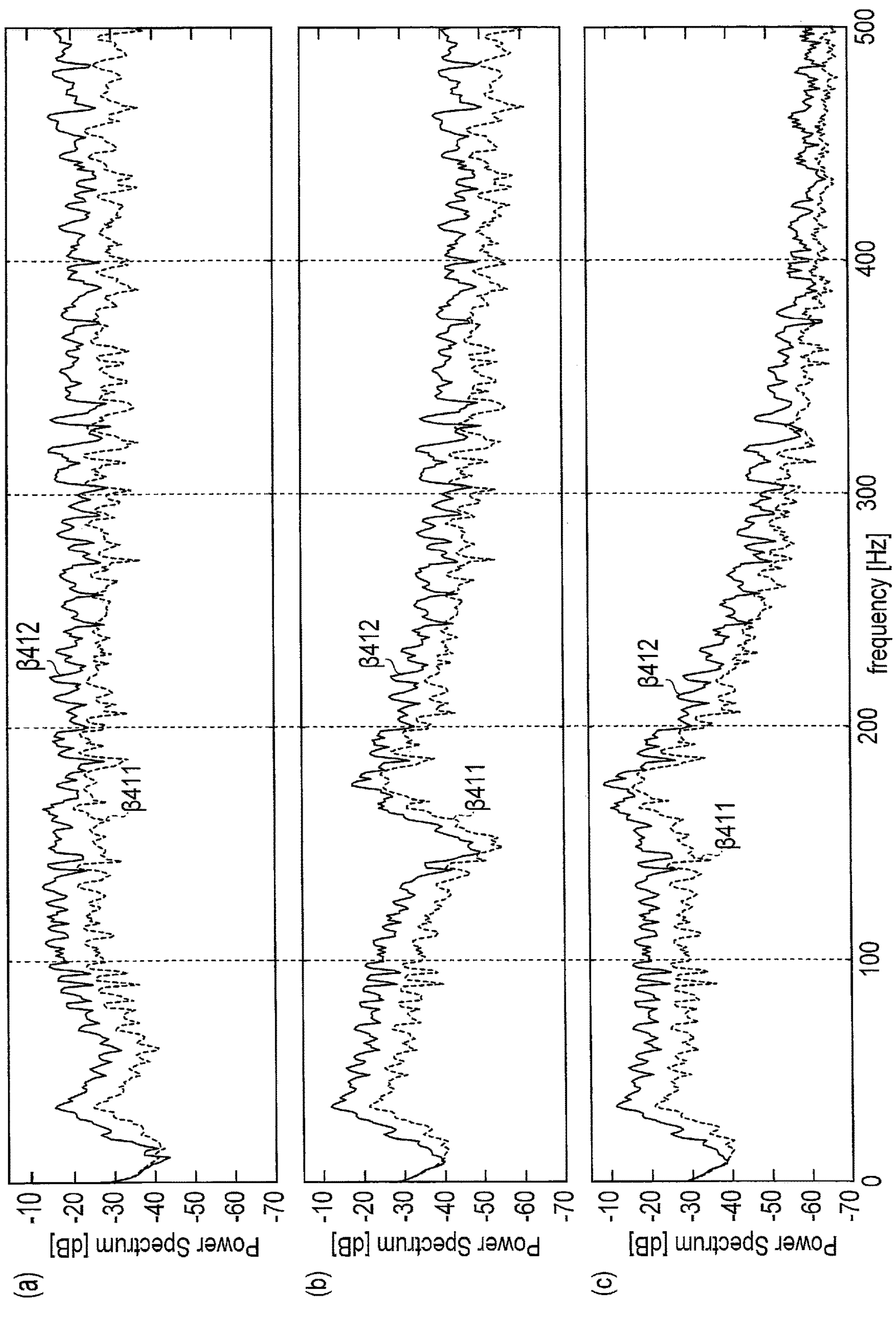
F I G. 20

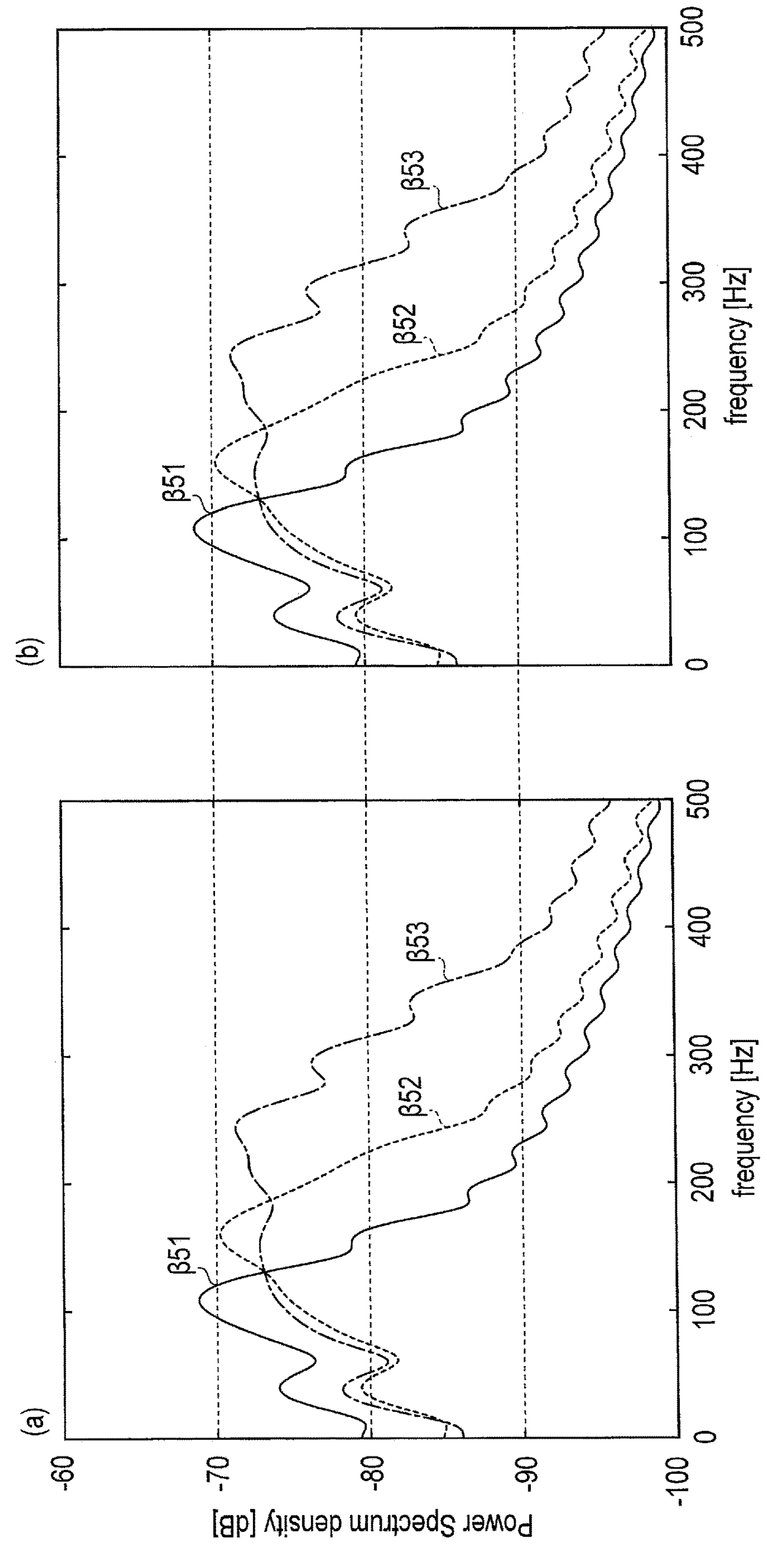
F I G. 22

DIAGNOSTIC METHOD AND DIAGNOSTIC APPARATUS

CROSS-REFERENCE TO RELATED APPLICATIONS

This application is based upon and claims the benefit of priority from Japanese Patent Application No. 2021-152422, filed Sep. 17, 2021, the entire contents of which are incorporated herein by reference.

FIELD

Embodiments described herein relate generally to a diagnostic method, a diagnostic apparatus, and a diagnostic program.

BACKGROUND

In mechanical structures, change of friction characteristics of the drive system and/or rigidity change due to change of junction of the structures occur as aged deterioration. To cope with such aged deterioration, for example, periodic replacement of friction members and/or deterioration evaluation by hammering of the mechanical structures are performed.

BRIEF DESCRIPTION OF THE DRAWINGS

FIG. 3 is a flowchart illustrating an example of processing relating to a first method for generating a position command used in the diagnostic system for a mechanical structure according to the embodiment;

FIG. 5 is a flowchart illustrating an example of processing relating to a third method for generating a position command used in the diagnostic system for a mechanical structure according to the embodiment;

FIG. 6B is an explanatory drawing of the third method for generating a position command used in the diagnostic system for a mechanical structure according to the embodiment, in which (a) illustrates an acceleration command generated in the third method, (b) illustrates a velocity command generated in the third method, and (c) illustrates a third position command generated in the third method;

FIG. 7 illustrates an example of calculation results for an impulse response of the mechanical structure calculated based on the acceleration command and measured acceleration in the diagnostic system for a mechanical structure according to the embodiment;

FIG. 8 is an enlarged view enlarging part relating to a nonlinear characteristic in the impulse response illustrated in FIG. 7;

FIG. 8A is a diagram illustrating a LOGSS signal based on an expression (3) in which a predetermined value is set;

FIG. 8B is a diagram illustrating a LOGSS signal acquired by shifting the signal of FIG. 8A by a predetermined value;

FIG. 8C is a spectrogram of the shifted LOGSS signal illustrated in FIG. 8B;

FIG. 8D is a diagram illustrating relation between time and frequency in the spectrogram of the LOGSS signal expressed by an expression (5-1) to an expression (5-3);

FIG. 9A is a flowchart illustrating an example of processing relating to a first power evaluation method for evaluating power in the response characteristic of the mechanical structure from the impulse response, the method being used in the diagnostic system for a mechanical structure according to the embodiment;

FIG. 9B is an explanatory drawing for explaining a section width selected when the processing of FIG. 9A is performed;

FIG. 10A is a flowchart illustrating an example of processing relating to a second power evaluation method for evaluating power in the response characteristic of the mechanical structure from the impulse response, the method being used in the diagnostic system for a mechanical structure according to the embodiment;

FIG. 10B is an explanatory drawing for explaining a section width selected when the processing of FIG. 10A is performed;

FIG. 20 is a diagram illustrating results of evaluation of the inertial system of a test example 4-1 in which Coulomb friction is set to a predetermined value by the diagnostic method for a mechanical structure according to the embodiment, in which (a) illustrates evaluation results for the mass point P1, (b) illustrates evaluation results for the mass point P2, and (c) illustrates evaluation results for the mass point P3;

FIG. 22 is a diagram illustrating results of evaluation of the inertial system of a test example 5 in which static friction is set to a predetermined value by the diagnostic method for a mechanical structure according to the embodiment, in which (a) illustrates evaluation results in the case where 0.1 [$kg \cdot m/s^2$] is set as the static friction, and (b) illustrates evaluation results in the case where 0.2 [$kg \cdot m/s^2$] is set as the static friction;

DETAILED DESCRIPTION

According to one embodiment, there are provided a diagnostic method and a diagnostic apparatus capable of recognizing a state of a mechanical structure.

According to one embodiment, a diagnostic method includes changing a position of a mechanical structure to be diagnosed with a drive unit based on an acceleration command, the acceleration command being generated based on a log swept sine (LOGSS) signal, calculating an impulse response based on the acceleration command and measured acceleration of the mechanical structure, the measured acceleration being measured by an accelerometer, analyzing at least one of a linear characteristic and a nonlinear characteristic relating to the mechanical structure based on the impulse response, and diagnosing the mechanical structure based on the at least one of the linear characteristic and the nonlinear characteristic relating to the mechanical structure.

Hereinafter, embodiments will be described with reference to the accompanying drawings.

Figure 1:
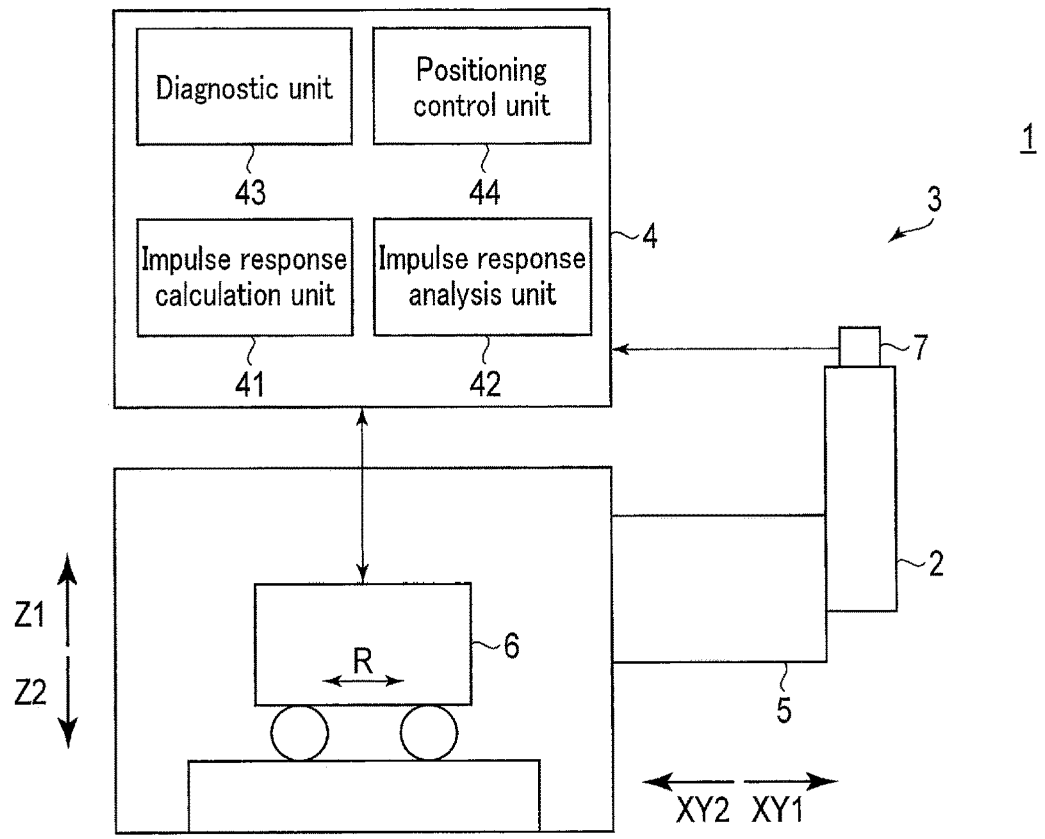
FIG. 1 is a schematic diagram illustrating an example of a diagnostic system for a mechanical structure according to an embodiment.

FIG. 1 is a schematic diagram illustrating an example of a diagnostic system for a mechanical structure according to an embodiment. A diagnostic system 1 illustrated in FIG. 1 diagnoses a deterioration state or the like of a mechanical structure 2 being a diagnostic target. A diagnostic apparatus 3 includes a controller 4, a connector 5, a drive unit 6, and a measuring unit 7. FIG. 1 defines a vertical direction (directions indicated with an arrow Z1 and an arrow Z2) and a horizontal direction (directions indicated with an arrow XY1 and an arrow XY2) crossing (orthogonal or substantially orthogonal to) the vertical direction. The controller 4 controls the whole diagnostic apparatus 3. The controller 4 includes an impulse response calculation unit 41, an impulse response analysis unit 42, a diagnostic unit 43, and a positioning control unit 44. The impulse response calculation unit 41 calculates an impulse response of the mechanical structure 2 to predetermined vibration or the like applied to the mechanical structure 2, as described later. The impulse response analysis unit 42 analyzes the impulse response based on the impulse response calculated by the impulse response calculation unit 41. The diagnostic unit 43 diagnoses the deterioration state or the like of the mechanical structure 2 based on the analysis results for the impulse response in accordance with predetermined processing described later. The positioning control unit 44 serves as a positioning control system and controls the drive unit 6.

The controller 4 includes, for example, a processor or an integrated circuit, and a storage medium, such as a memory. The controller 4 includes a CPU (Central Processing Unit), an ASIC (Application Specific Integrated Circuit), a microcomputer, a FPGA (Field Programmable Gate Array), a DSP (Digital Signal Processor), or the like. In the diagnostic apparatus 3, the controller 4 may include one integrated circuit or the like, or a plurality of integrated circuits or the like. In the diagnostic apparatus 3, the controller 4 performs processing by executing a program or the like stored in the storage medium or the like. In the controller 4, the program executed by the processor may be stored in a computer (server) connected thereto via a network, such as the Internet, or a server in a cloud environment. In this case, the processor downloads the program via the network. The processing performed by the impulse response calculation unit 41, the impulse response analysis unit 42 and the diagnostic unit 43 are achieved by, for example, the CPU or the like of the controller 4.

The connector 5 connects the mechanical structure 2 being the diagnostic target to the diagnostic apparatus 3 by a predetermined method. The drive unit 6 performs driving based on a control command output from the controller 4. The measuring unit 7 measures information relating to the mechanical structure 2 being the diagnostic target. The information relating to the mechanical structure is, for example, a position of the mechanical structure 2, velocity of the mechanical structure 2, or acceleration of the mechanical structure 2. The measuring unit 7 may acquire temporal variation of the information relating to the mechanical structure 2.

The measuring unit 7 may be attached to the mechanical structure 2 to acquire the information relating to the mechanical structure 2, or attached to the connector 5 or the drive unit 6 to acquire the information relating to the mechanical structure 2. The measuring unit 7 may be attached to at least one of the mechanical structure 2, the connector 5, and the drive unit 6. In the case of diagnosing change of a friction characteristic of the mechanical structure 2, the measuring unit 7 preferably acquire the information relating to the mechanical structure 2 at the drive unit 6.

In the diagnostic system 1, the drive unit 6 is driven, and thereby the diagnostic apparatus 3 applies predetermined vibration or the like to the mechanical structure 2. The positioning control unit 44 of the controller 4 functions as the positioning control system as described above to control the drive unit 6. In the positioning control system, for example, a position command value relating to the positioning target is fed back to the control system by a predetermined method. In this manner, the position of the positioning target is properly controlled. As illustrated in FIG. 1, for example, the drive unit 6 repeatedly moves within a predetermined range as indicated with an arrow along the horizontal direction. In this manner, the mechanical structure 2 being the diagnostic target shakes together with the diagnostic apparatus 3, following the operation of the drive unit 6. That is, the mechanical structure 2 is vibrated by the drive unit 6. As described above, the controller 4 drives the drive unit 6 based on the control command, and the position of the mechanical structure 2 changes in correspondence with drive of the drive unit 6. In addition, in the diagnostic system 1, the controller 4 performs predetermined arithmetic processing described later based on information relating to the control command for the drive unit 6 and information relating to the mechanical structure 2. In this manner, the diagnostic system 1 is enabled to acquire information relating to the deterioration state of the mechanical structure 2.

As the information relating to the control command for the drive unit 6, the controller 4 uses an acceleration command in the present embodiment. The controller 4 determines a double integral for the acceleration command with respect to the time, and performs predetermined arithmetic processing described later to generate a position command corresponding to the control command. As the information relating to the mechanical structure 2, the actual acceleration of the mechanical structure 2 measured by the measuring unit 7 (hereinafter referred to as "measured acceleration") is used in the present embodiment. The controller 4 calculates an impulse response based on the acceleration command and the measured acceleration. The controller 4 is capable of acquiring information relating to the deterioration state of the mechanical structure 2 by performing predetermined arithmetic processing based on the calculated impulse response. When the measuring accuracy (such as the SN ratio and the resolution) of the measuring unit 7 is sufficiently high, the controller 4 may use the second order differential of the measured position of the mechanical structure 2 as the measured acceleration.

Figure 2:
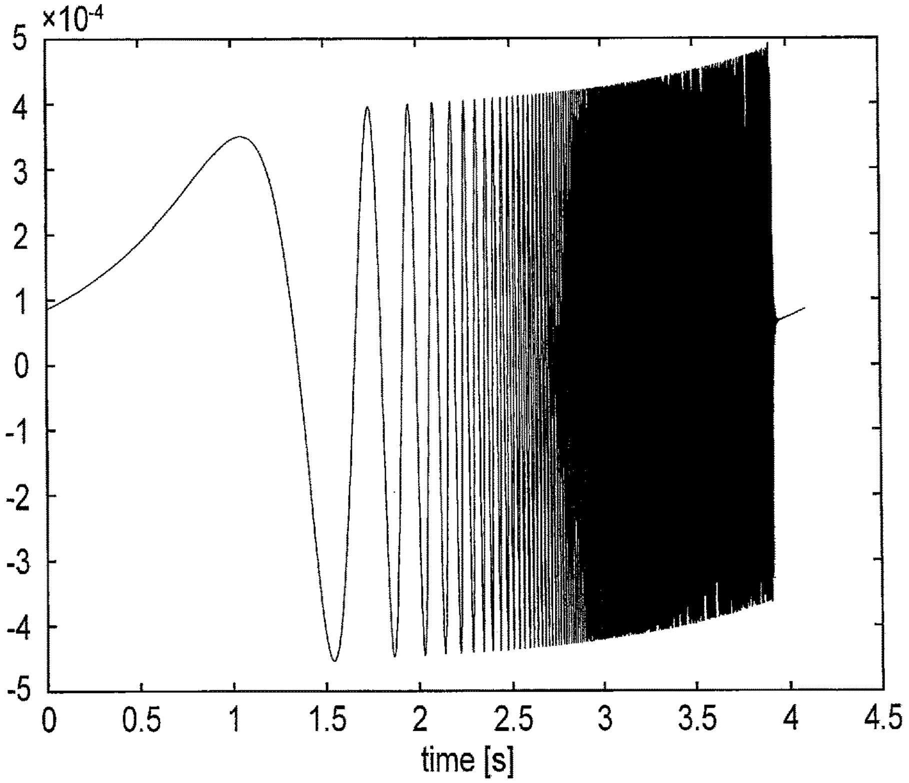
FIG. 2 is a diagram illustrating an example of a log swept sine (LOGSS) signal.

The following is an explanation of details of the control command output by the controller 4 to the drive unit 6. In the diagnostic apparatus 3 according to the present embodiment, the controller 4 outputs a command based on a LOGSS (log swept sine or logarithmic swept sine) signal as the control command to the drive unit 6. FIG. 2 illustrates an example of a LOGSS signal. The vertical axis indicates the level in an arbitrary unit, and the horizontal axis indicates the time. As illustrated in FIG. 2, the LOGSS signal is a type of a sweep signal, and a signal in which the frequency is swept on the logarithmic scale. The LOGSS signal can be generated on, for example, the expression disclosed in WO2006/011356. In the present embodiment, the controller 4 uses a command being based on the LOGSS signal as the acceleration command for the drive unit 6. For example, the controller 4 determines a double integral for the acceleration command with respect to the time to generate a position command for the drive unit 6. The controller 4 controls the position of the drive unit 6 by inputting the position command as the control command (command value of the positioning control system). When the controller 4 calculates the impulse response described above using the LOGSS signal as the acceleration command, a linear characteristic of the response of the mechanical structure 2 is separated from a nonlinear characteristic of the response of the mechanical structure 2 with respect to the time axis. The diagnostic system 1 analyzes these separated linear characteristic and nonlinear characteristic to acquire information relating to the deterioration state of the mechanical structure 2.

Figure 4:
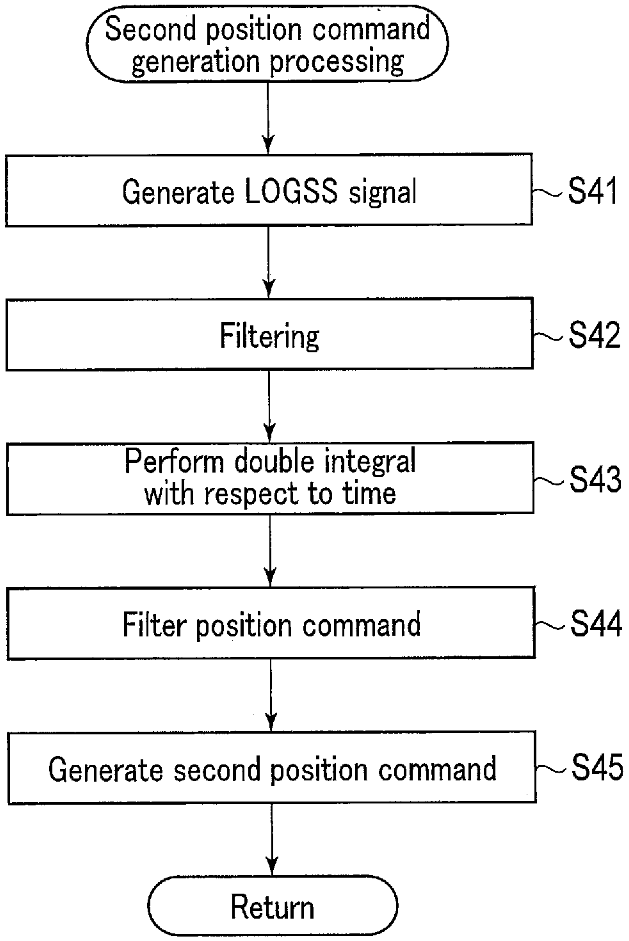
FIG. 4 is a flowchart illustrating an example of processing relating to a second method for generating a position command used in the diagnostic system for a mechanical structure according to the embodiment.
Figure 6A:
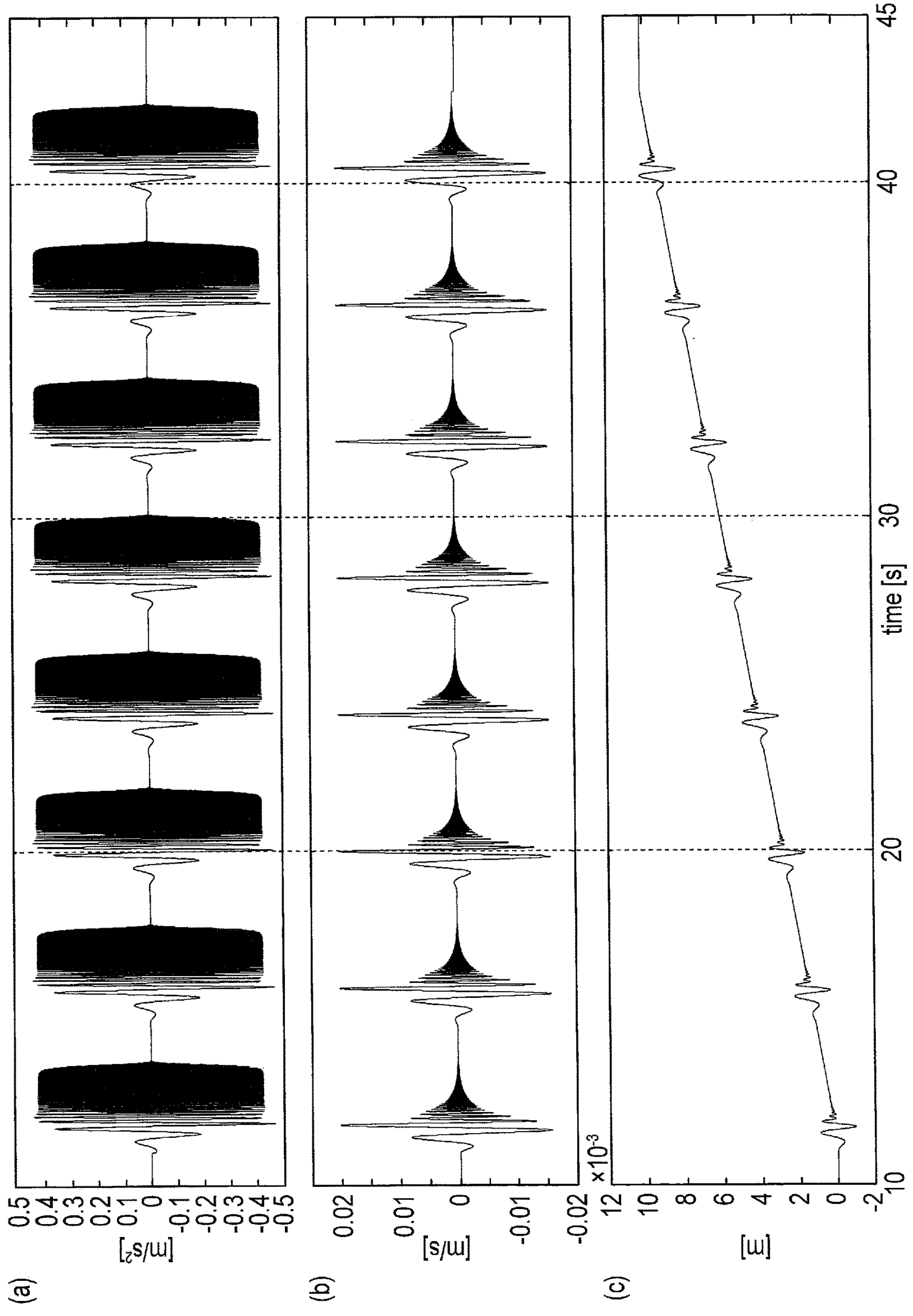
FIG. 6A is an explanatory drawing of the first method for generating a position command used in the diagnostic system for a mechanical structure according to the embodiment, in which (a) illustrates an acceleration command generated in the first method, (b) illustrates a velocity command generated in the first method, and (c) illustrates a first position command generated in the first method.
Figure 6C:
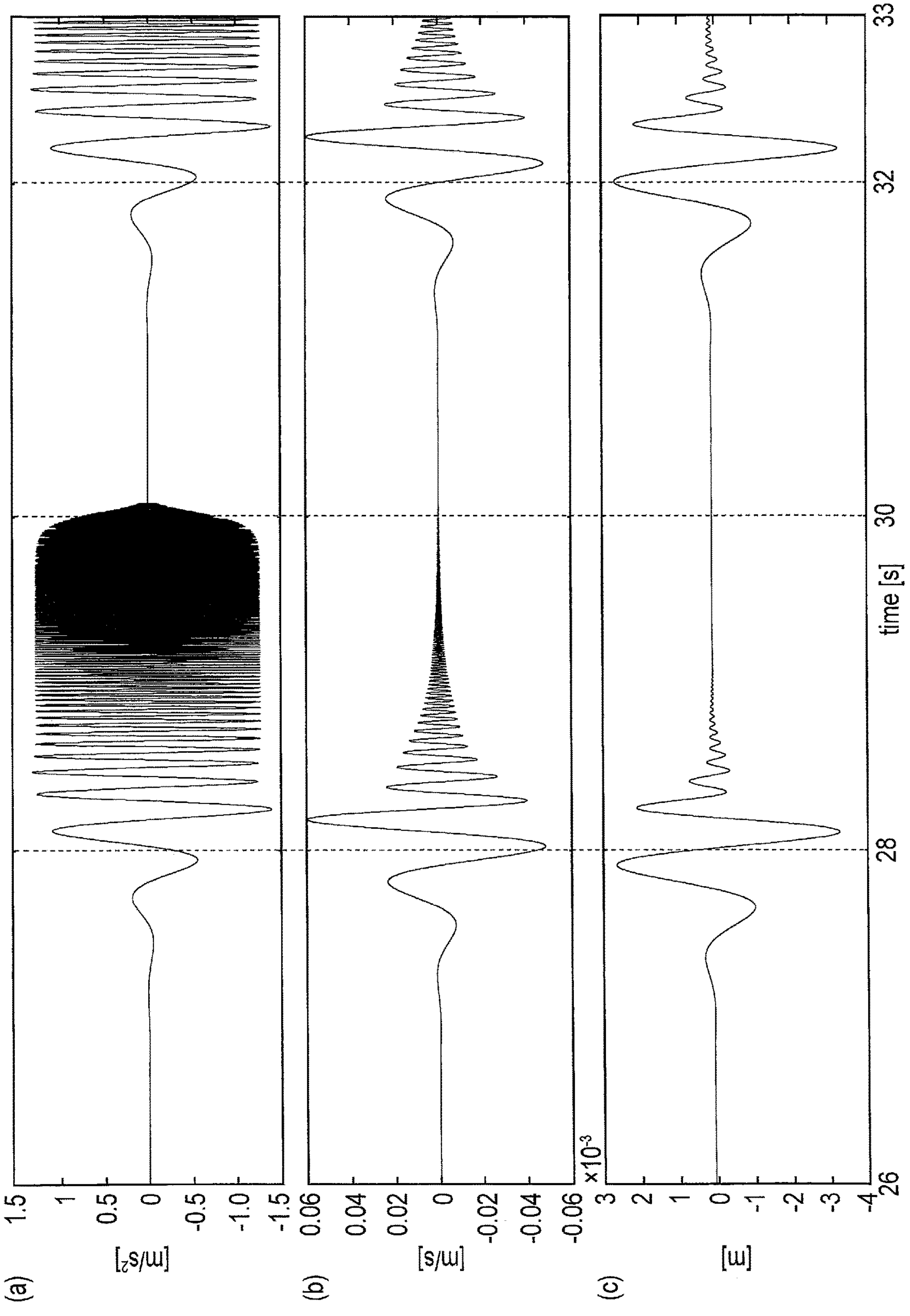
FIG. 6C is an enlarged view of the third method for generating a position command illustrated in FIG. 6B, in which (a) illustrates part of the acceleration command generated in the third method, (b) illustrates part of the velocity command generated in the third method, and (c) illustrates part of the position command generated in the first method, in an enlarged state.

In the present embodiment, the controller 4 generates a position command from the acceleration command using one of the following three methods for generating a position command. Each of FIG. 3 to FIG. 5 illustrates an example of a flowchart illustrating processing of generating a position command at the controller 4. FIG. 3 illustrates a first position command generation method, FIG. 4 illustrates a second position command generation method, and FIG. 5 illustrates a third position command generation method. FIG. 6A illustrates an acceleration command, a velocity command, and a position command generated when the controller 4 performs the first position command generation method. Each of FIG. 6B and FIG. 6C illustrates an acceleration command, a velocity command, and a position command generated when the controller 4 performs the third position command generation method. In FIG. 6A to FIG. 6C, (a) illustrates an acceleration command, (b) illustrates a velocity command, and (c) illustrates a position command. In FIG. 6A to FIG. 6C, the vertical axis indicates the level of the command, and the horizontal axis indicates the time [s]. In FIG. 6A to FIG. 6C, the value of the vertical axis is an example, and is not limited thereto. For example, the level of the command may be properly changed in accordance with the mechanical structure 2 being the diagnostic target.

As illustrated in FIG. 3, in the first position command generation method, the controller 4 generates a LOGSS signal based on the expression disclosed in WO2006/011356 (S31). As described above, since the diagnostic system 1 calculates an impulse response of the mechanical structure 2, the controller 4 uses a signal acquired by arranging generated LOGSS signal for one time a predetermined number of times. The predetermined number of times is preferably, for example, two or more. Increasing the predetermined number of times suppresses an influence of measuring noise. The controller 4 filters the predetermined number of LOGSS signals together using a bandpass filter.

In this filtering, filtering causing no phase delay is applied. As filtering causing no phase delay, for example, the controller 4 performs filtering for the LOGSS signals in the forward direction, reverses the filtered LOGSS signals in time, performs filtering for the filtered LOGSS signals that are reversed in time, and reverses the twice-filtered signals in time. For example, in the filtering, high-frequency components are cut or attenuated. Performing such filtering enables suppression of increase with time in value of the position command generated from the acceleration command. The upper cutoff frequency in the filtering is preferably set to a frequency equal to or higher than the diagnostic frequency for the mechanical structure 2 being the diagnostic target. The controller 4 determines a double integral for the generated acceleration command (see (a) in FIG. 6A) with respect to the time (S33) to generate a first position command (see (c) in FIG. 6A) being based on the first position command generation method (S34).

As illustrated in FIG. 4, in the second position command generation method, the controller 4 generates a position command in the same manner as the first position command generation method. Specifically, in the second position command generation method, the processing steps S41 to S43 are the same as the processing steps S31 to S33 of the first position command generation method illustrated in FIG. 3. Thereafter, the controller 4 applies filtering using a high-pass filter to the generated position command (S44). Also in this filtering, filtering causing no phase delay is applied in the same manner as the filtering described above. In this manner, the controller 4 generates a second position command being based on the second position command generation method (S45).

As illustrated in FIG. 5, in the third position command generation, the controller 4 generates a LOGSS signal for one time in the same manner as the first position command generation method. The controller 4 generates a LOGSS signal acquired by arranging the generated LOGSS signal for one time two times (S51). The controller 4 filters the two LOGSS signals together using a bandpass filter, in the same manner as the first position command generation method (S52). The controller 4 compares a signal level before filtering to a signal level after filtering in the second LOGSS signal (S53). Comparison of the signal levels is performed using the amplitude of each LOGSS signal, specifically, by calculation of 20× $\log_{10}$ (the absolute value of the amplitude) [dB]. The controller 4 determines the tap number (provisional tap number) corresponding to a point having mutually different levels by a predetermined threshold or more, based on comparison between the signal level before filtering and the signal level after filtering. The predetermined threshold is, for example, approximately 10 dB to 20 dB. The tap number is a number indicating the number of the tap when the signal length is N tap. Generally, the tap number is defined as "fs×ta" when the sampling frequency is fs [Hz] and the noted time is to [s]. Instead of the processing at S53, the tap number may be determined by determining t by substituting the upper cutoff frequency described above for f in the expression (5-1) and multiplying the obtained value by fs.

The controller 4 determines an integral of a part corresponding to the second LOGSS signal in the filtered LOGSS signal. The controller 4 determines the tap number (terminal tap number) corresponding to a point in which the integral result becomes substantially zero after the time corresponding to the provisional tap number described above, based on a result of determining the integral of the LOGSS signal (S54). The controller 4 terminates the second LOGSS signal at the terminal tap number (S55). Specifically, the controller 4 substitutes 0 for the tap value after the terminal tap number. The controller 4 performs processing such that a signal acquired by determining the integral for the terminated second LOGSS signal converges to 0 at the predetermined tap (S56). Specifically, the controller 4 performs processing such that a velocity command converges to 0 at the predetermined tap. For example, the controller 4 multiplies a signal acquired by determining the integral for the LOGSS signal at the terminal tap number by the sampling frequency, and sets a value obtained by multiplying the multiplication result by −1 as a value of the next tap of the terminal tap number of the LOGSS signal. The controller 4 sets the value of the amplitude in subsequent taps of the LOGSS signal to 0. The controller 4 uses the second LOGSS signal to which a series of processes has been applied as the LOGSS signal for one time, and arranging the LOGSS signal for one time a predetermined number of times to generate an acceleration command (see (a) in FIG. 6C) (S57). The controller 4 determines a double integral for the generated acceleration command with respect to the time (S58) to generate a third position command (see (c) in FIG. 6C) being based on the third position command generation method (S59).

By using such three position command generation methods, the diagnostic system 1 is enabled to calculate the transmission characteristic to the mechanical structure 2 based on the acceleration command and the measured acceleration (acceleration response) measured by the measuring unit 7. In addition, by using a LOGSS signal, the diagnostic system 1 is enabled to increase the SN ratio in a region being a low frequency band. In addition, by generating a position command from the acceleration command using the LOGSS signal, the amplitude of the signal of the position command is increased in a low frequency band and the amplitude of the signal of the position command gradually decreases with increase in frequency. In this manner, vibration from low frequency band to medium frequency band is easily generated (easily excited) in the mechanical structure 2. That is, the diagnostic system 1 according to the present embodiment is capable of performing system identification from a low frequency band to a medium frequency band that is noted in the mechanical structure 2 with high probability due to the fact that the signal power of the input signal is sufficiently high in the low frequency band to the medium frequency band.

In addition, in the second position command and the third position command, a constant value position command is generated, as illustrated in FIG. 6B and FIG. 6C. The constant value position command is a command in which the value of the position command is fixed in a certain time section. For this reason, the mechanical structure 2 being the diagnostic target starts to move from a still state. Accordingly, the static friction characteristic of the mechanical structure 2 can be diagnosed. In addition, the amplitude of each of the second position command and the third position command can be changed more largely than that of the first position command. For this reason, the SN ratio can be increased in the second position command and the third position command. When the amplitude of the acceleration command is small, change of a friction characteristic of the mechanical structure 2 easily appears in the nonlinear characteristic. This is because each of static friction and Coulomb friction is generated with a fixed value regardless of the acceleration command, and an influence of the nonlinear characteristic relatively increases when the amplitude of the acceleration command is small. For this reason, when the friction characteristic of the mechanical structure 2 is diagnosed, power change of the nonlinear characteristic of the mechanical structure 2 can be easily checked by decreasing the amplitude of the acceleration command to a certain degree while maintaining a proper SN ratio.

The controller 4 controls the position of the mechanical structure 2 using the position command generated from the acceleration command as described above as a control command. The measuring unit 7 measures the acceleration accompanying change of position of the mechanical structure 2 as an acceleration response (measured acceleration). The controller 4 calculates an impulse response based on the acceleration command and the acceleration response. The acceleration command is generated based on a signal acquired by arranging a LOGSS signal for one time a predetermined number of times as described above. For this reason, the position command is also a signal acquired by arranging a command signal for one time a predetermined number of times, and the mechanical structure 2 moves to repeat change of position for one time a plurality of times. In the measured acceleration of the mechanical structure 2 as described above, the controller 4 performs averaging for the second and subsequent changes in acceleration, with the length of the signal in the LOGSS signal serving as the length for one time. The controller 4 performs fast Fourier transform (FFT) for the signal obtained by averaging. The controller 4 multiplies the signal having been subjected to FFT by an inverse characteristic of the LOGSS signal in the acceleration command, in the frequency domain. The controller 4 performs inverse fast Fourier transform (inverse FFT) for the signal obtained by multiplying to calculate an impulse response. In this operation, the controller 4 may properly correct an influence of filtering with a bandpass filter in the processing in the frequency domain.

FIG. 7 illustrates an example of an impulse response of the mechanical structure 2 in the diagnostic system 1 calculated as described above. In FIG. 7, the horizontal axis indicates the time [s], and the vertical axis indicates the level of the impulse response. The impulse response illustrated in FIG. 7 is a dynamics characteristic of the mechanical structure 2 derived from the acceleration response of the mechanical structure 2 for the acceleration command based on the LOGSS signal. For this reason, a linear characteristic of the mechanical structure 2 appears on a region RA, and a nonlinear characteristic (hereinafter also referred to as "distortion characteristic") of the mechanical structure 2 appears in a region RB. The region RA corresponds to time (approximately several seconds) extending from time slightly before the time corresponding to the peak value of the impulse response to time when residual vibration of the mechanical structure 2 occurs. The region RB is properly set in a region other than the region RA in accordance with a characteristic of the mechanical structure 2. In the present embodiment, the region RB is set based on a method for calculating distortion occurrence time described later.

Because the impulse response is a characteristic calculated based on discrete Fourier transform (DFT), repeatability of the input signal is assumed in advance. For this reason, the "time slightly before the time corresponding to the peak value of the impulse response" includes a section illustrated as a region RC in FIG. 7 when, for example, the delay characteristic of the impulse response is short. FIG. 8 is an enlarged view enlarging the region RB corresponding to the nonlinear characteristic of the impulse response. In FIG. 8, the horizontal axis indicates the time, and the vertical axis indicates the level of the impulse response. Because the impulse response is a characteristic calculated based on discrete Fourier transform (DFT), second-order distortion 81, fourth-order distortion 82, and sixth-order distortion 83 appear in the order illustrated in FIG. 8, in this example.

The following is an explanation of a method for calculating the distortion occurrence time. For example, the definition of the frequency characteristic of the LOGSS signal is expressed by an expression (1) to an expression (3). N is a LOGSS signal length, q is an arbitrary integer, each of N and q is a set variable, and j is an imaginary number.

$$\mathrm{LOG}SS(i)=\begin{cases}1 & (i=0)\\ \dfrac{\exp\{-j\alpha\times i\log(i)\}}{\sqrt{i}} & \left(1\le i\le \dfrac{N}{2}\right)\\ \dfrac{\exp\{-j\alpha\times(N-i)\log(N-i)\}}{\sqrt{N-i}} & \left(\dfrac{N}{2}+1\le i\le N-1\right)\end{cases} \tag{1}$$

$$J=(q)\times N \tag{2}$$

$$\alpha=\frac{J\pi}{\frac{N}{2}\log\left(\frac{N}{2}\right)} \tag{3}$$

Based on the expressions (1) to (3), a LOGSS signal is expressed by an expression (4). Re indicates a real part, and IFFT indicates inverse Fourier transform.

$$\text{logss}=\text{Re}[\text{IFFT}(\text{LOGSS})] \tag{4}$$

When the sampling frequency fs is 4000 Hz, a LOGSS signal length N is $2^{14}$, and q is ¾, the signal of the expression (3) is expressed as illustrated in FIG. 8A. A signal acquired by shifting the signal illustrated in FIG. 8A by (N-J)/2 is expressed as illustrated in FIG. 8B. In FIG. 8A and FIG. 8B, the vertical axis indicates the level of the command, and the horizontal axis indicates the time [s]. In the example described later, a LOGSS signal is generated based on the expression (1) to the expression (4), and a signal acquired by shifting the generated LOGSS signal by (N-J)/2 is used as an acceleration command. The shift amount is not limited to the value described above, but may be set such that, for example, the tap values from 0 s (1 tap) to 0.1 s (0.1×fs tap) are small, as illustrated in FIG. 8B.

FIG. 8C illustrates a spectrogram of the shifted LOGSS signal illustrated in FIG. 8B. The vertical axis indicates the frequency [Hz], and the horizontal axis indicates the time [s]. In the spectrogram illustrated in FIG. 8C, when the vertical axis and the horizontal axis are mutually exchanged, the signal changes in a logarithmic manner. Specifically, the logarithmic frequency is proportional to the time, and the frequency serves as an exponential function of the time. Accordingly, the relation between the time and the frequency in the spectrogram of the LOGSS signal is expressed by an expression (5-1) to an expression (5-3), in which $t_{offset}$ is the offset time and shift indicates the shift amount of the LOGSS signal described above.

$$t = \frac{J}{f_s \log\left(\frac{N}{2}\right)} \log\left(f \times \frac{N}{f_s}\right) + t_{offset} \tag{5-1}$$

$$t_{offset} = \frac{J}{f_s \log\left(\frac{N}{2}\right)} + \frac{\text{shift}}{f_s} \tag{5-2}$$

$$\text{shift} = \frac{N-J}{2} \tag{5-3}$$

FIG. 8D is a graph illustrating relation between the time and the frequency in the spectrogram of the LOGSS signal expressed by the expression (5-1) to the expression (5-3). In FIG. 8D, the vertical axis indicates the frequency [Hz], and the horizontal axis indicates the time [s].

Figure 8E:
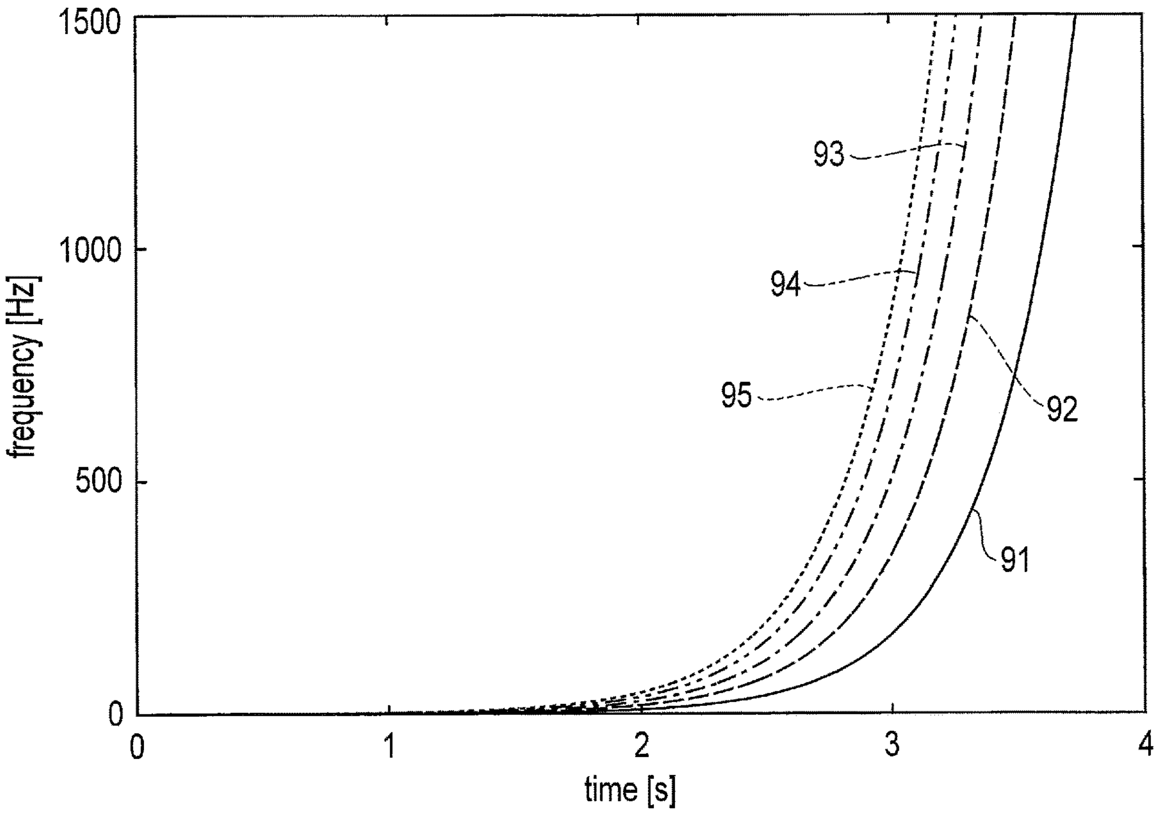
FIG. 8E illustrates a spectrogram at the time when harmonic distortion occurs in the LOGSS signal having the spectrogram illustrated in FIG. 8D.

In this state, when harmonic distortion of the LOGSS signal occurs in a state in which no dynamics characteristic exists, a graph illustrated in FIG. 8E is acquired. FIG. 8E illustrates a spectrogram in the case where harmonic distortion occurs in the LOGSS signal having the spectrogram illustrated in FIG. 8D. A line 91 is a curve of a fundamental wave response expressed by the expression (5-1) to the expression (5-3), a line 92 is a curve of a second harmonic response (response curve of first-order distortion), a line 93 is a curve of a third harmonic response (response curve of second-order distortion), a line 94 is a curve of a fourth harmonic response (response curve of third-order distortion), and a line 95 is a curve of a fifth harmonic response (response curve of fourth-order distortion).

Figure 8F:
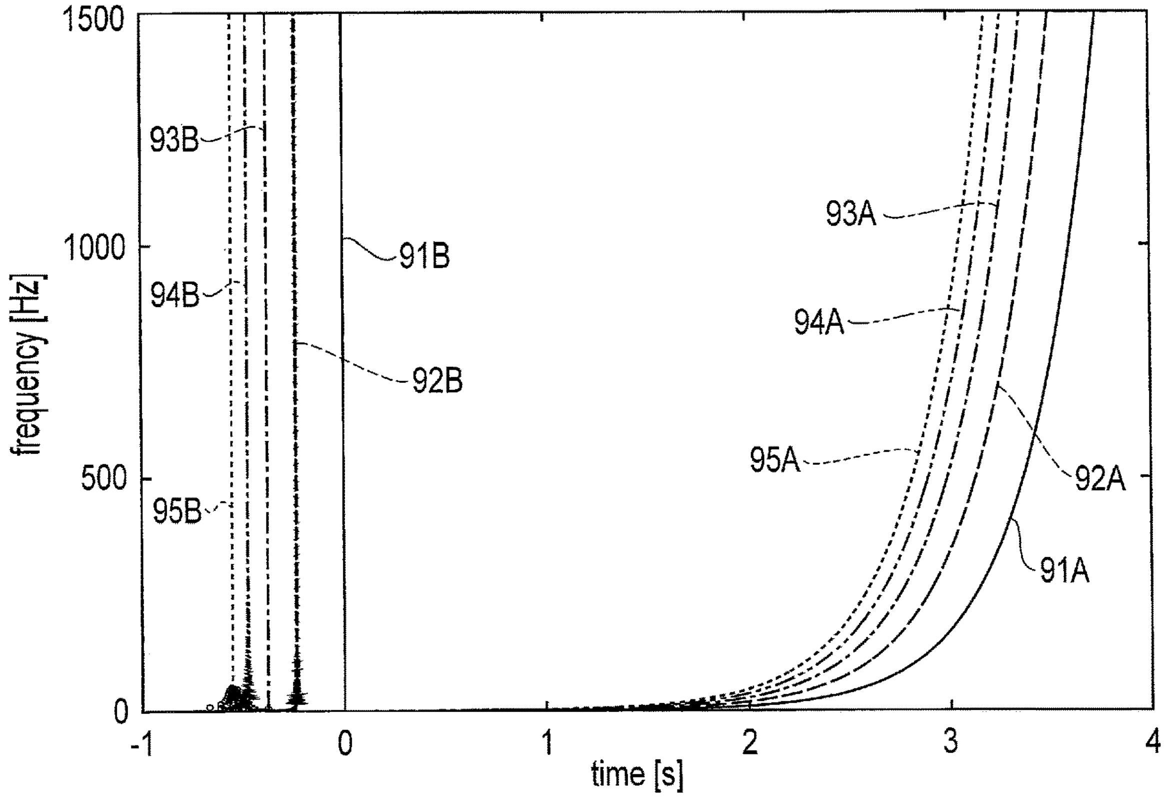
FIG. 8F illustrates impulse response obtained by converting response curves of the LOGSS signal having the spectrogram illustrated in FIG. 8E with an inverse characteristic of the LOGSS signal.

In the case where such harmonic distortions of the LOGSS signal occur, when the measured response curves as described above are converted by the inverse characteristic of the LOGSS signal, a graph illustrated in FIG. 8F is acquired. FIG. 8F illustrates impulse responses acquired by conversion by the inverse characteristic of the LOGSS signal. The vertical axis indicates the frequency [Hz], and the horizontal axis indicates the time [s]. A line 91A, a line 92A, a line 93A, a line 94A, and a line 95A are response curves of the respective lines 91 to 95. The line 91A is an impulse response corresponding to the fundamental response. The line 92B is an impulse response corresponding to the second harmonic response (a distortion characteristic of first-order distortion). The line 93B is an impulse response corresponding to the third harmonic response (a distortion characteristic of second-order distortion). The line 94B is an impulse response corresponding to the fourth harmonic response (a distortion characteristic of third-order distortion). The line 95B is an impulse response corresponding to the fifth harmonic response (a distortion characteristic of fourth-order distortion). The impulse response corresponding to a harmonic response calculated as described above appears in a region of time before the time 0, that is, in a region of the minus time (region in a noncausal direction). In addition, an impulse response corresponding to the harmonic response is separated into distortions of respective orders in the region in the noncausal direction. In the present embodiment, the LOGSS signal is used as the input signal to separate the impulse response into distortions of the respective orders, and distortions of the respective orders can be analyzed using the distortion characteristics of the distortions of the respective orders.

Figure 8G:
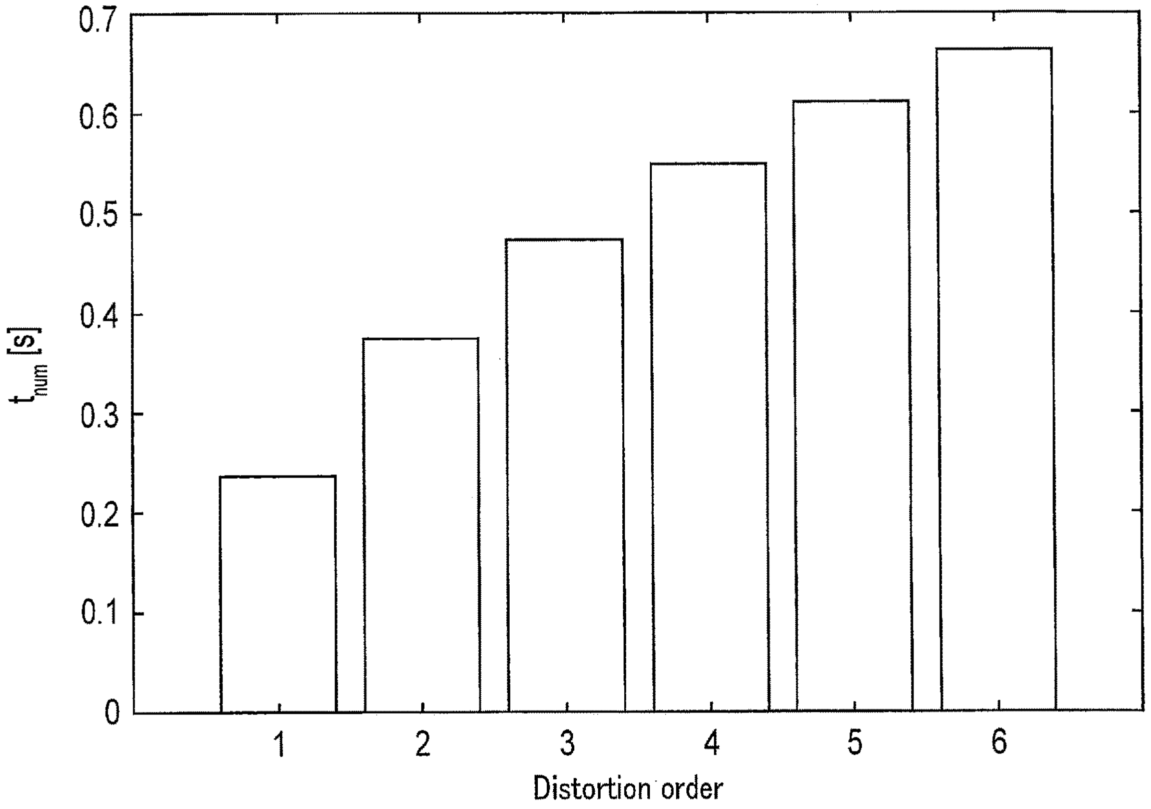
FIG. 8G is a diagram illustrating results of calculation of the occurrence time of the distortion characteristics illustrated in FIG. 8F based on an expression (6)

In addition, by separating the distortion characteristics as described above, the distortion characteristics of the respective orders are separated into different time regions. In this operation, the occurrence time (−t(num)) [s] of the distortion characteristic of each of the orders is expressed by an expression (6). num indicates the order of distortion. For example, when setting is performed as described above, the occurrence time of the distortion characteristic illustrated in FIG. 8F is as illustrated in FIG. 8G. In FIG. 8G, the horizontal axis indicates the distortion order, and the vertical axis indicates the time [s].

$$\begin{aligned} t_{num} &= \frac{J}{f_s \log\left(\frac{N}{2}\right)} \left\{ \log\left(\frac{N(num+1)f_c}{f_s}\right) - \log\left(\frac{N f_c}{f_s}\right) \right\} \\ &= \frac{J}{f_s \log\left(\frac{N}{2}\right)} \log(num+1) \end{aligned} \tag{6}$$

Figure 8H:
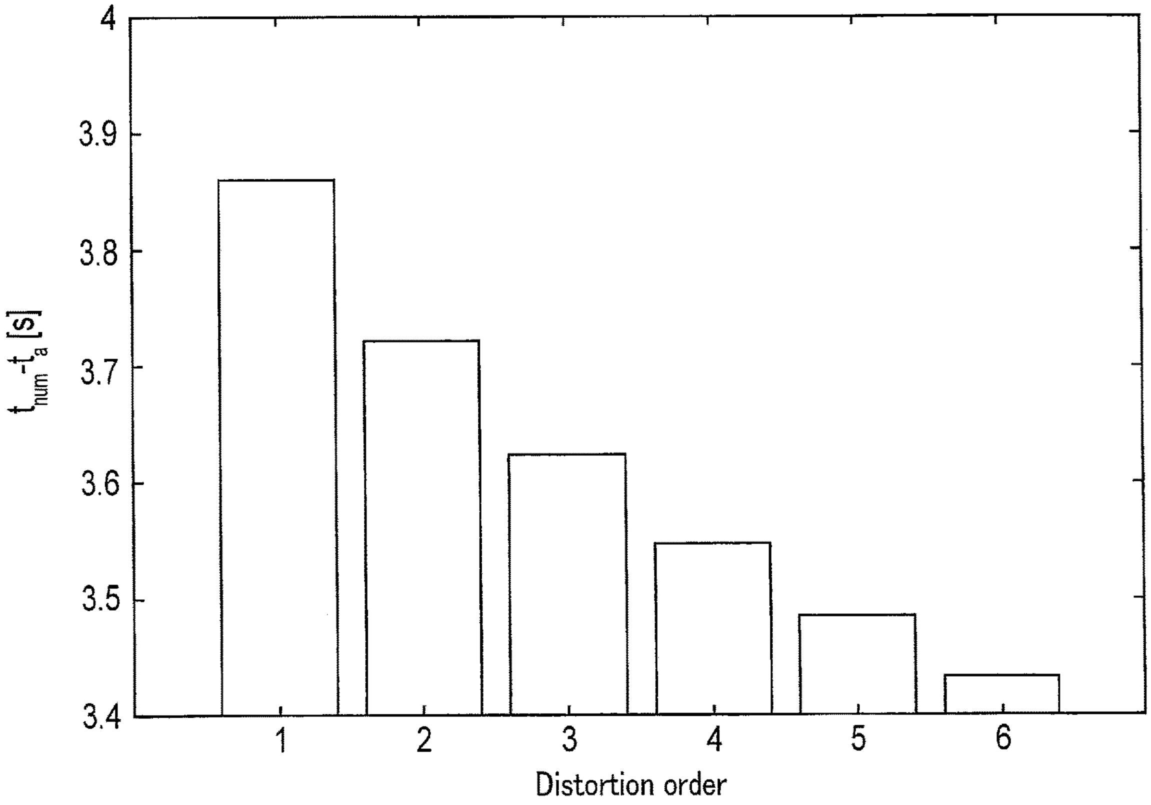
FIG. 8H is a diagram illustrating results of calculation of the occurrence time of the distortion characteristics illustrated in FIG. 8F in the impulse response based on an expression (7)

In addition, the distortion occurrence time in the impulse response derived based on the occurrence time of the distortion characteristic of each of the orders based on the impulse response corresponding to the fundamental wave response is expressed by an expression (7) in consideration of the repeatability of the discrete Fourier transform. In the expression, $t_a$ is delay time of the dynamic characteristic (also referred to as "waste time"), and corresponds to rise time of the first wave in the causal direction satisfying causality. For example, when setting is performed as described above, the distortion occurrence time of the impulse response is as illustrated in FIG. 8H. In FIG. 8H, the horizontal axis indicates the distortion order, and the vertical axis indicates the time [s].

$$t_{numh} = \begin{cases} \frac{N}{f_s} - t_{num} + t_a & (t_{num} > t_a) \\ t_a - t_{num} & (t_{num} < t_a) \end{cases} \tag{7}$$

When the control band of the positioning control system (that is, the band of vibration applied to the mechanical structure 2) is fc0 [Hz], the frequency band having a high SN ratio is equal to or smaller than fc0 [Hz], in the response generated as a linear characteristic of the mechanical structure 2. By contrast, a nonlinear response of the mechanical structure 2 is caused by a harmonic wave having a frequency (multiple length frequency) of an integer multiple, as illustrated in FIG. 8E. For example, in the case of first-order distortion, when the frequency of vibration applied by the drive unit 6 is fa [Hz], the diagnostic system 1 evaluates first-order distortion based on a nonlinear response excited at 2 fa [Hz]. When the order of the distortion characteristic is num, the frequency hand having a high SN ratio in each distortion characteristic is equal to or smaller than (num+1)×fc0 [Hz]. Accordingly, even when the control band fc0 of the positioning control system is low, the diagnostic system 1 is capable of evaluating the distortion characteristic while a high SN ratio is maintained up to the frequency (num+1)×fc0 [Hz].

Figure 11A:
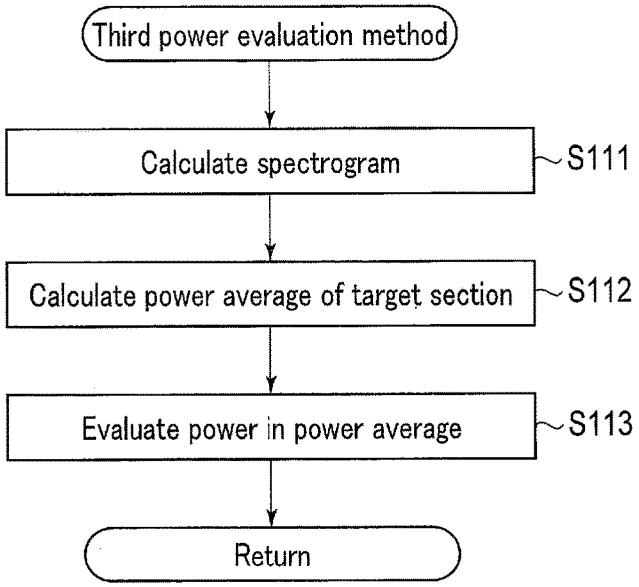
FIG. 11A is a flowchart illustrating an example of processing relating to a third power evaluation method for evaluating power in the response characteristic of the mechanical structure from the impulse response, the method being used in the diagnostic system for a mechanical structure according to the embodiment.
Figure 11B:
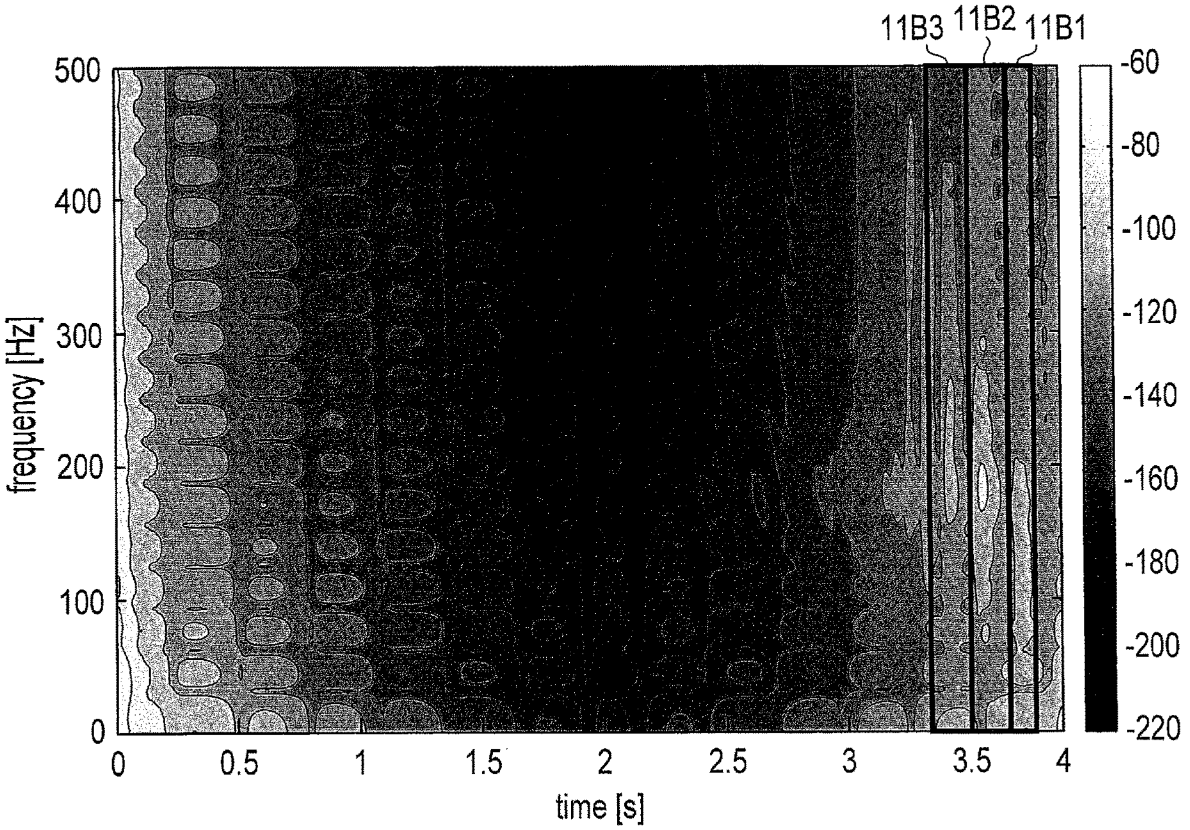
FIG. 11B is an explanatory drawing for explaining a section width selected when the processing of FIG. 11A is performed.

The controller 4 evaluates the power of the linear characteristic and the power of the nonlinear characteristic based on the linear characteristic and the nonlinear characteristic included in the calculated impulse response. In the present embodiment, the controller 4 performs power evaluation using any one of the following three evaluation methods. Each of FIG. 9A, FIG. 10A, and FIG. 11A illustrates an example of a flowchart of a power evaluation method performed by the controller 4. FIG. 9A illustrates a first power evaluation method, FIG. 10A illustrates a second power evaluation method, and FIG. 11A illustrates a third power evaluation method. Each of FIG. 9B, FIG. 10B, and FIG. 11B illustrates an example of an evaluation section in the corresponding power evaluation method.

As illustrated in FIG. 9A, in the first power evaluation method, the controller 4 performs FFT for each of sections of the impulse response, each of the sections having a section width (tap length) $2^b$ shorter than the tap length N ($=2^a$) (b<a) of the LOGSS signal (S91). As illustrated in FIG. 9B, for example, the controller 4 performs FFT in the section width $2^b$ for the region RA in which the linear characteristic appears. The controller 4 performs FFT in the section width $2^b$ for the region RB in which the nonlinear characteristic appears. The region RB includes the occurrence time of the distortion order being the evaluation target, which is calculated in accordance with the expression (7). Specifically, the controller 4 extracts parts of the impulse response being the transform target with the section width $2^b$ set in advance. The controller 4 performs FFT for each of the extracted impulse responses. The controller 4 evaluates power for each of the frequencies in each part of the impulse response to which FFT has been applied (S92).

As illustrated in FIG. 10A, in the second power evaluation method, the controller 4 sets the value of the impulse response in a section other than the section extending from the time slightly before the time corresponding to the peak value of the impulse response to the time at which the residual vibration converges to 0 (S101). The controller 4 performs FFT for the whole impulse response (S102). Specifically, in the second power evaluation method, FFT is performed only for the region in which the linear characteristic of the mechanical structure 2 appears, as the transform target. As illustrated in FIG. 10B, for example, the controller 4 performs FFT for the region RA and the region RC in each of which a linear characteristic appears. Specifically, the controller 4 performs FFT for the time region after the occurrence time of the first-order distortion (after the first-order distortion converges), which is calculated in accordance with the expression (7). The termination time of the time for which the residual vibration occurs is time corresponding to a point with a value decreased by 60 dB from the peak power value, for example, when the impulse response is plotted by $20\times\log_{10}$ (the absolute value of the amplitude of the impulse response). As specific processing, the controller 4 sets the value of the impulse response in a region other than a preset linear characteristic to 0, in the impulse response being the transform target. The controller 4 performs FFT for the impulse response including a predetermined region having a value of the impulse response replaced by 0. The controller 4 evaluates the power for each frequency of the impulse response to which FFT has been applied (S103). In this manner, the controller 4 is enabled to evaluate a linear characteristic part in the impulse response being the transform target.

As illustrated in FIG. 11A, in the third power evaluation method, the controller 4 calculates a power average in a spectrogram of the impulse response. Specifically, the controller 4 calculates a spectrogram of the impulse response being the transform target by a predetermined method (S111). A known method may be properly used as the method for calculating a spectrogram. After a spectrogram is calculated, the controller 4 calculates a power average for each frequency using the spectrogram corresponding to each of predetermined target sections (S112). Each of the predetermined target section is, for example, a section corresponding to the distortion order being the analysis target and including the distortion occurrence time described above. The controller 4 evaluates the target section based on the power average (S113). As illustrated in FIG. 11B, for example, the power average is calculated for each of a section 11B1 corresponding to the second-order distortion, a section 11B2 corresponding to the third-order and the fourth-order distortions, and a section 11B3 corresponding to the fifth-order and the sixth-order distortions. A known method can be properly used as the method for calculating the power average.

For example, in the case of evaluating sections $s_1$ to $s_2$ [s] of the spectrogram, when the spectrogram power(f, t) [dB] is calculated with the pitch width dt, the power average POWER is expressed by an expression (8) and an expression (9).

$$F(f) = \frac{1}{r}\sum_{i=1}^{r} 10^{\frac{power[t(i),f]}{10}} \tag{8}$$

$$\mathrm{POWER}(f) = 10\log_{10}[F(f)] \tag{9}$$

In the expressions, t (1)=s1, and t (r)=s2. In addition, dt satisfies an expression (10).

$$dt\times(r-1)=s_2-s_1 \tag{10}$$

Evaluation of the distortion characteristic using a spectrogram may be performed using machine learning. Machine learning serving as an example uses, as an abnormality data, spectrogram data in the case where the diagnostic system 1 determines that the state of the mechanical structure 2 is abnormal, and uses, as normality data, spectrogram data in the case where the diagnostic system 1 determines that the state of the mechanical structure 2 is normal. In addition, machine learning relating to the image is performed based on abnormality data and normality data. In machine learning relating to an image, for example, a CNN (Convolutional Neural Network) is used. The diagnostic system 1 diagnoses the deterioration state of the mechanical structure 2 being the diagnostic target, based on a discrimination result from a discriminator generated by performing the machine learning relating to the image described above.

In the first power evaluation method, when a sufficient section width for evaluation can be obtained as the target section, the result acquired in the first power evaluation method is substantially equal to the result acquired in the third power evaluation method. However, for example, when the transform section target is part of an impulse response corresponding to a nonlinear characteristic of each distortion, it is probable that no sufficient section width satisfying necessary frequency resolution can be obtained in the first power evaluation method. In this case, the nonlinear characteristic of the mechanical structure 2 can be properly evaluated by evaluating the impulse response using the third power evaluation method.

Figure 12:
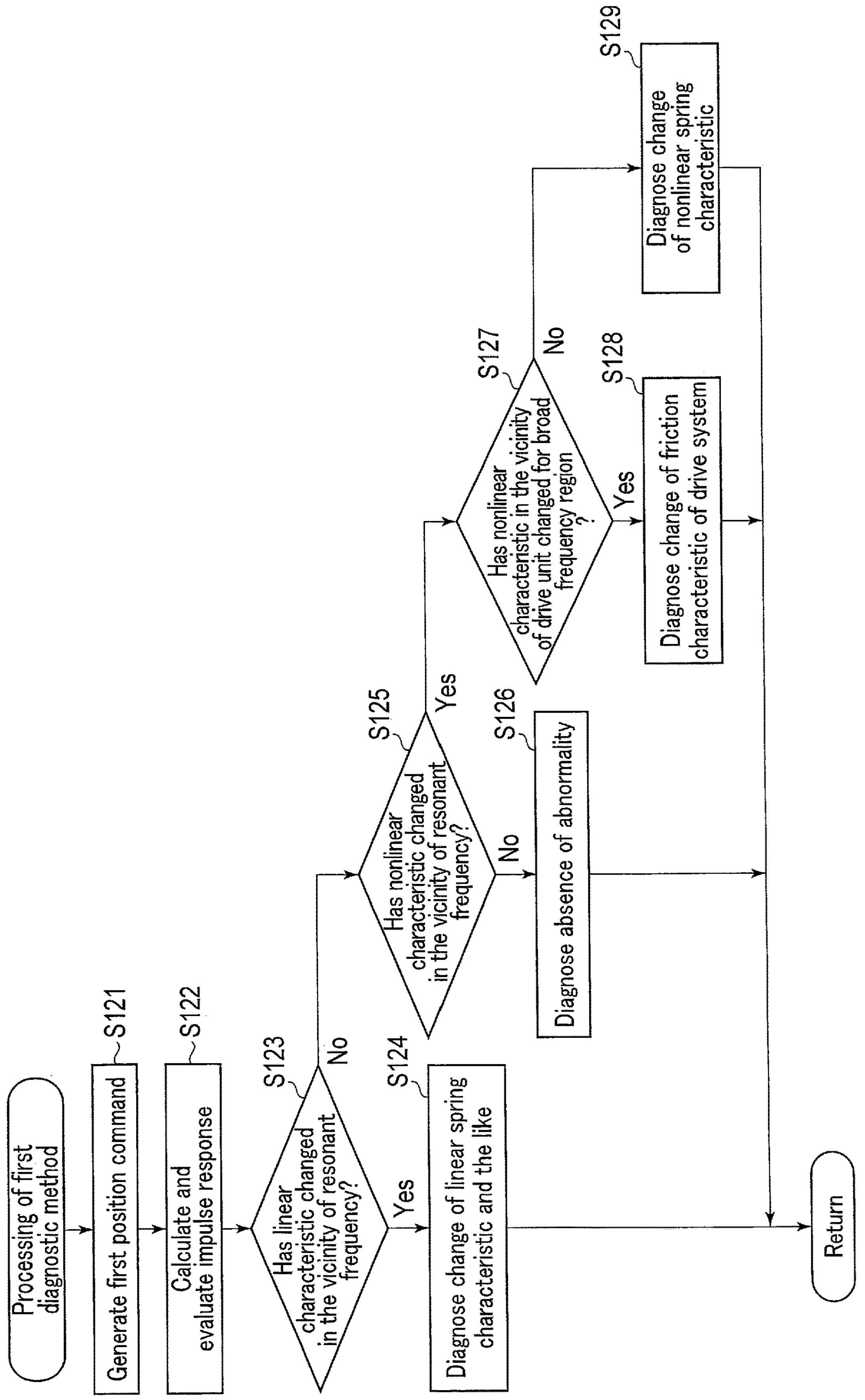
FIG. 12 is an example of a flowchart of first diagnostic processing performed by the diagnostic system for a mechanical structure according to the embodiment.
Figure 13:
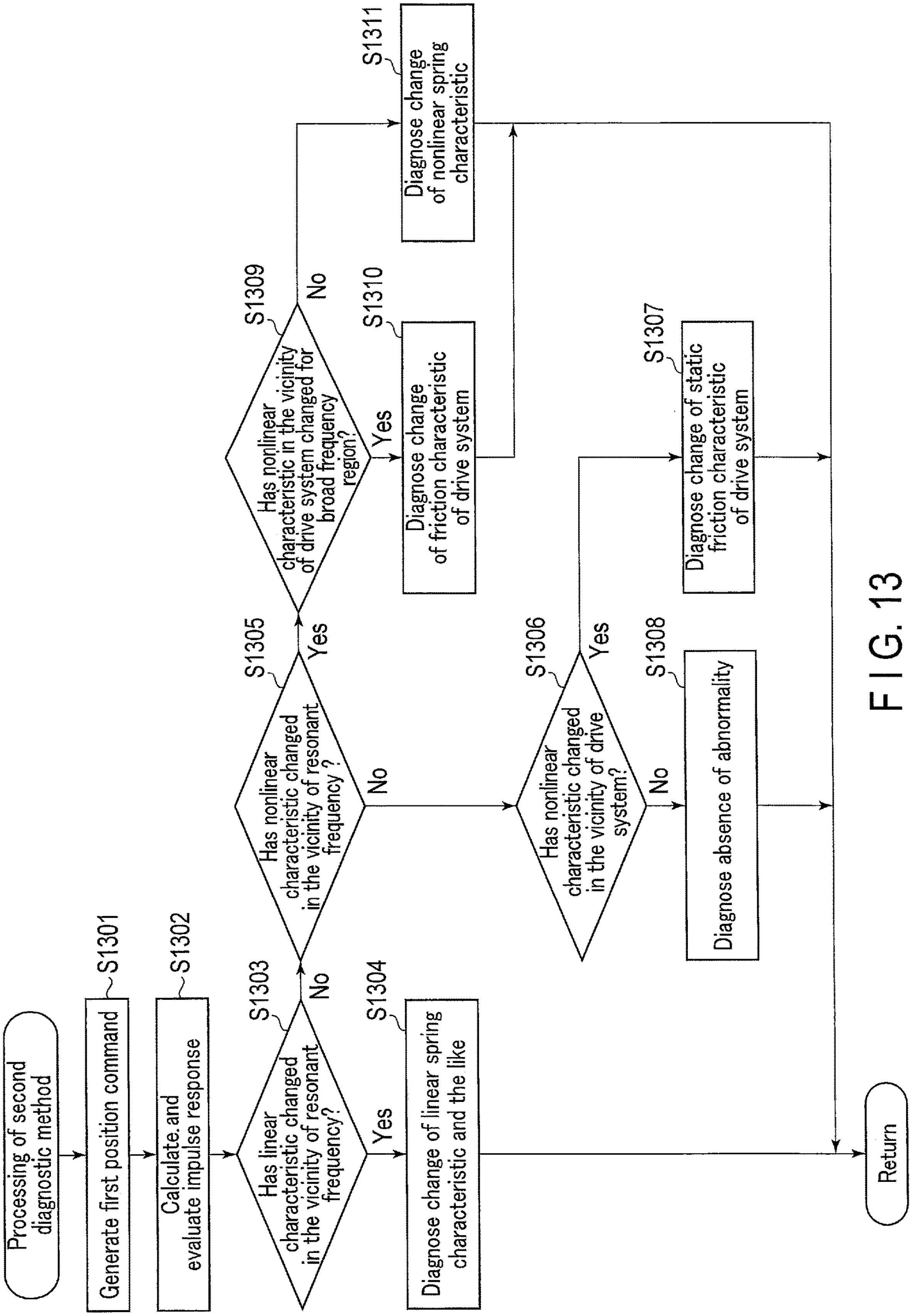
FIG. 13 is an example of a flowchart of second diagnostic processing performed by the diagnostic system for a mechanical structure according to the embodiment.
Figure 14:
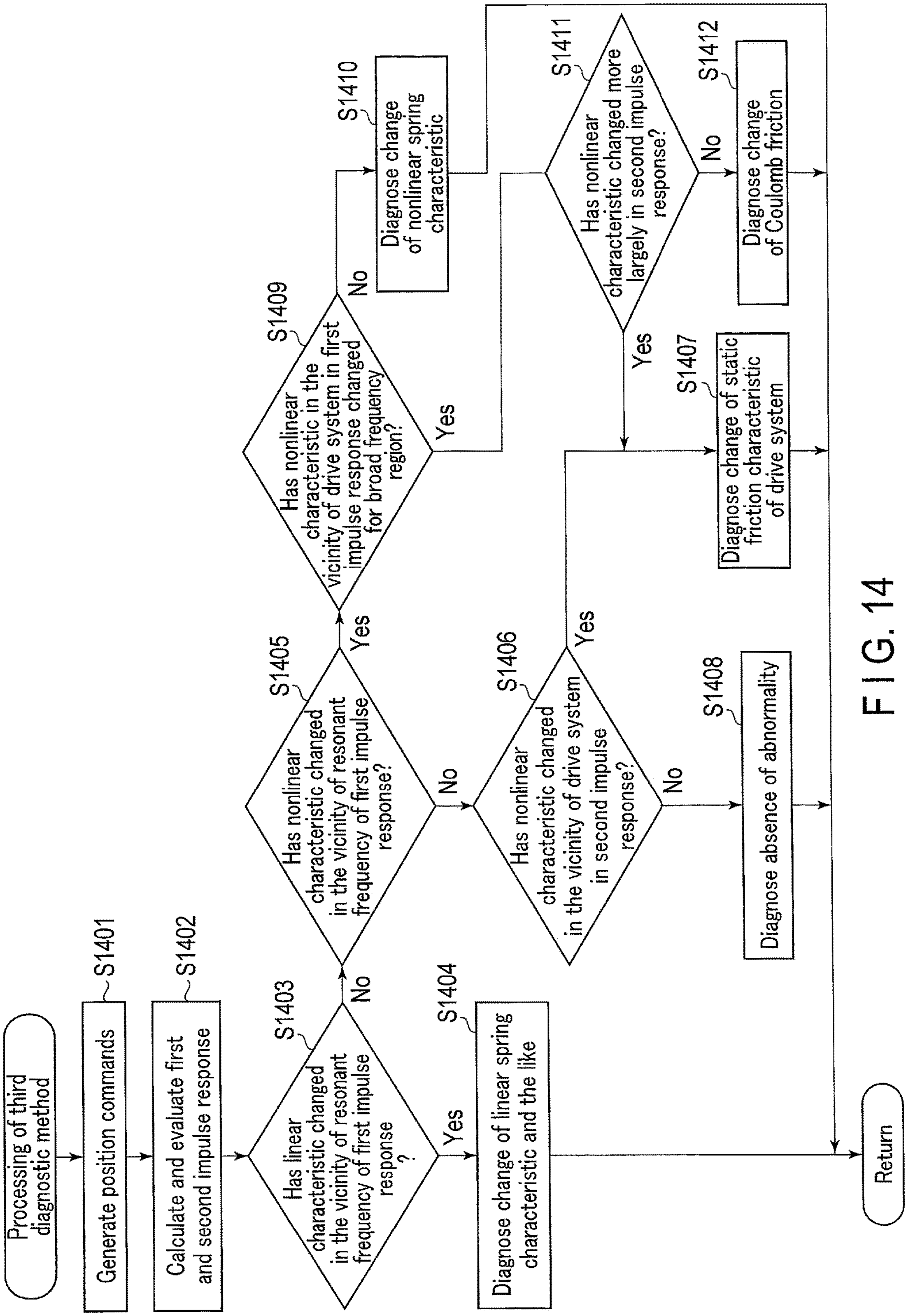
FIG. 14 is an example of a flowchart of third diagnostic processing performed by the diagnostic system for a mechanical structure according to the embodiment.

The following is an explanation of processing performed when the diagnostic system 1 diagnoses the mechanical structure 2 being the diagnostic target. In the diagnostic system 1 according to the present embodiment, the diagnostic system 1 evaluates the deterioration state of the mechanical structure 2 using any one of three diagnostic methods. Each of FIG. 12 to FIG. 14 illustrates an example of a flowchart of diagnostic processing performed by the diagnostic system 1. FIG. 12 illustrates a first diagnostic method, FIG. 13 illustrates a second diagnostic method, and FIG. 14 illustrates a third diagnostic method.

As illustrated in FIG. 12, in the first diagnostic method, the controller 4 generates a position command by the first position command generation method as described above (S121). Based on the generated position command, the controller 4 controls the mechanical structure 2, and calculates an impulse response by the method described above (S122). The controller 4 evaluates the calculated impulse response by the method described above (S122). The controller 4 determines whether any change of a linear characteristic component in evaluation results for the impulse response has occurred in the vicinity of the resonance frequency of the mechanical structure 2 (S123). Change of a linear characteristic component may be determined by comparing the value with a linear characteristic of the mechanical structure 2 being the standard (standard linear characteristic), which is acquired in advance.

In an example, the controller 4 determines whether the linear characteristic has changed beyond a threshold from the standard linear characteristic. In the case of using a damping characteristic, when the diagnostic system 1 determines the phenomenon "the vibration level increases to a level $\sqrt{2}$ times or more as large as the standard vibration level corresponding to the standard linear characteristic" as an abnormality, the threshold of increase for the second power evaluation method is 3 dB. In addition, when the diagnostic system 1 determines the phenomenon "the vibration level increases in a level $\sqrt{2}$ times or more as large as the standard vibration level corresponding to the standard linear characteristic" as an abnormality, the threshold of increase for the second power evaluation method is 6 dB. In the case of using a linear spring characteristic, the threshold of change of resonance frequency is approximately scores of hertz.

When change occurs in the vicinity of the resonance frequency (Yes at S123), the controller 4 determines that the linear spring characteristic and/or the structural damping characteristic relating to the resonant structure of the mechanical structure 2 has changed (S124). When no change has occurred in the vicinity of the resonance frequency (No at S123), the controller 4 determines whether any power change of the nonlinear characteristic (distortion characteristic) has occurred in the vicinity of the resonance frequency (S125). Change of the nonlinear characteristic component may be determined by comparing the value with a nonlinear characteristic of the mechanical structure 2 being the standard (first standard nonlinear characteristic), which is acquired in advance. For example, the controller 4 determines whether the nonlinear characteristic has changed beyond a threshold from the first standard nonlinear characteristic.

For example, when the diagnostic system 1 determines the phenomenon "the vibration level increases to a level times or more as large as the standard vibration level corresponding to the standard nonlinear characteristic" as an abnormality, the threshold of increase for the first or the third power evaluation method is 3 dB. In addition, when the diagnostic system 1 determines the phenomenon "the vibration level increases to a level twice or more as large as the standard vibration level corresponding to the standard nonlinear characteristic" as an abnormality, the threshold of increase for the first or the third power evaluation method is 6 dB.

When the power of the nonlinear characteristic has not changed in the vicinity of the resonance frequency (No at S125), the controller 4 determines that no abnormality has occurred in the mechanical structure 2 (Yes S126). When the power of the nonlinear characteristic has changed in the vicinity of the resonance frequency (Yes at S125), the controller 4 determines whether any power change of the distortion characteristic has occurred for a broad frequency region, in a member disposed in the vicinity of the drive system (S127). Change of the nonlinear characteristic component may be determined by comparing the value with a nonlinear characteristic of the mechanical structure 2 serving as the standard (second standard nonlinear characteristic), which is acquired in advance. For example, the controller 4 determines whether the nonlinear characteristic has changed beyond a threshold from the second standard nonlinear characteristic.

For example, when the diagnostic system 1 determines the phenomenon "the vibration level increases to a level $\sqrt{2}$ times or more as large as the standard vibration level corresponding to the standard nonlinear characteristic in the broad frequency region" as an abnormality, the threshold of increase for the first or the third power evaluation method is 3 dB. In addition, when the diagnostic system 1 determines the phenomenon "the vibration level increases to a level twice or more as large as the standard vibration level corresponding to the standard nonlinear characteristic in the broad frequency region" as an abnormality, the threshold of increase for the first or the third power evaluation method is 6 dB.

When power change of the nonlinear characteristic has occurred for a broad frequency region (Yes at S127), the controller 4 determines that the friction characteristic of the drive system has changed (S128). When no power change of the distortion characteristic has occurred for a broad frequency region (No at S127), the controller 4 determines that the nonlinear spring characteristic of the resonant mechanism has changed (S129). As described above, the controller 4 performs the first diagnostic method to diagnose the state of the mechanical structure 2. Change of the nonlinear spring characteristic corresponds to change of attachment rigidity of the resonant mechanism.

The resonance frequency of the resonant mechanism is determined based on coupled vibration of the whole mechanical structure 2. For this reason, the resonance frequency of the resonant mechanism changes according to change of the friction characteristic of the drive unit 6 and/or the attachment rigidity of the resonant mechanism (nonlinear spring characteristic). The resonance frequency of the resonant mechanism corresponds to the frequency at which a distortion characteristic takes a peak value. For example, in an example applying a nonlinear spring characteristic in the examples described later, the resonance frequency of the resonant mechanism changes from 178 Hz that is the resonance frequency in the case of applying no nonlinear spring characteristic to 182 Hz that is a frequency corresponding to the peak of the distortion characteristic. In the present embodiment, the diagnostic system 1 determines power change of the nonlinear characteristic in the "vicinity" of the resonance frequency, for example, at processing S125 in FIG. 12 such that the diagnostic system 1 enables performance of diagnostic processing even when the change described above has occurred. The change of the resonance frequency described above increases as the ratio of mass of the noted resonant structure to the mass of the whole mechanical structure 2 increases.

As illustrated in FIG. 13, in the second diagnostic method, the controller 4 generates a position command by the second position command generation method or the third position command generation method as described above. In the second diagnostic method, processing steps S1301 to S1305 and S1309 to S1311 are similar to the processing steps S121 to S125 and S127 to S129 of the first diagnostic method illustrated in FIG. 12. In the second diagnostic method, when no power of the nonlinear characteristic has changed in the vicinity of the resonance frequency (No at S1305), the controller 4 further determines whether the nonlinear characteristic has changed in the member disposed in the vicinity of the drive system (S1306). Change of the nonlinear characteristic may be determined by comparing the value with the nonlinear characteristic of the mechanical structure 2 serving as the standard (third standard nonlinear characteristic), which is acquired in advance. For example, the controller 4 determines whether the nonlinear characteristic has changed beyond a threshold from the third standard nonlinear characteristic.

For example, when the diagnostic system 1 determines the phenomenon "the vibration level increases to a level $\sqrt{2}$ times or more as large as the standard vibration level corresponding to the standard nonlinear characteristic" as an abnormality, the threshold of increase for the first or the third power evaluation method is 3 dB. In addition, when the diagnostic system 1 determines the phenomenon "the vibration level increases to a level twice or more as large as the standard vibration level corresponding to the standard nonlinear characteristic" as an abnormality, the threshold of increase for the first or the third power evaluation method is 6 dB.

When the nonlinear characteristic has changed (Yes at S1306), the controller 4 determines that the friction characteristic of the drive system has changed (S1307). When the nonlinear characteristic has not changed (No at S1306), the controller 4 determines that no abnormality has occurred in the mechanical structure 2 (S1308).

As illustrated in FIG. 14, in the third diagnostic method, the first position command generation method and the second position command generation method are used in combination, or the first position command method and the third position command method are used in combination (S1401). Based on a position command generated by the first position command generation method, the controller 4 controls the mechanical structure 2, and calculates and evaluates the first impulse response by the method described above (S1402). Thereafter, based on a position command generated by the second or third position command generation method, the controller 4 controls the mechanical structure 2, and calculates and evaluates the second impulse response by the method described above (S1402).

The controller 4 determines whether any change of the linear characteristic in evaluation results for the first impulse response has occurred in the vicinity of the resonance frequency of the mechanical structure 2 (S1403). When change has occurred in the vicinity of the resonance frequency (Yes at S1403), the controller 4 determines that the linear spring characteristic and/or the structural damping characteristic relating to the resonant structure of the mechanical structure 2 has changed (S1404). When no change has occurred in the vicinity of the resonance frequency (No at S1403), the controller 4 determines whether any power change of the nonlinear characteristic (distortion characteristic) has occurred in the vicinity of the resonance frequency (S1405). When the power of the nonlinear characteristic has not changed in the vicinity of the resonance frequency (No at S1405), the controller 4 further determines whether any change has occurred in the distortion characteristic in the evaluation results for the second impulse response, in the member disposed in the vicinity of the drive system (S1406). When any change has occurred in the distortion characteristic (Yes at S1406), the controller 4 determines that the friction characteristic of the drive system has changed (S1407). When no change has occurred in the distortion characteristic (No at S1406), the controller 4 determines that no abnormality has occurred in the mechanical structure 2 (S1408).

When the power of the nonlinear characteristic has changed in the vicinity of the resonance frequency (Yes at S1405), the controller 4 determines whether any power change of the distortion characteristic in the evaluation results for the first impulse response has occurred for a broad frequency region, in the member disposed in the vicinity of the drive system (S1409). When no power change of the distortion characteristic has occurred for the broad frequency region (No at S1409), the controller 4 determines that the nonlinear spring characteristic of the resonant mechanism has changed (S1410). When any power change of the distortion characteristic has occurred for the broad frequency region (Yes at S1409), the controller 4 determines whether the evaluation result for the second impulse response exhibits a change larger than that of the evaluation result for the first impulse response (S1411). When the evaluation result for the second impulse response exhibits a larger change (Yes at S1411), the controller 4 determines that static friction in the friction characteristic of the drive system has changed (S1407). When the evaluation result for the second impulse response does not exhibit a larger change (No at S1411), the controller 4 determines that Coulomb friction in the friction characteristic of the drive system has changed (S1412).

As described above, the position command generated by the first position command generation method has a value increasing with time. For this reason, when the controller 4 controls the mechanical structure 2 using this position command as the control command, the mechanical structure 2 is not changed to a stopped state. For this reason, the static friction characteristic of the drive system cannot be evaluated by the first diagnostic method described above. By contrast, when a position command generated by the second or third position command generation method is used as the control command, the stopped state of the mechanical structure 2 occurs. Accordingly, the second diagnostic method described above allows the static friction characteristic of the drive system to be evaluated. In addition, the third diagnostic method using a combination of the first position command and the second position command or a combination the first position command and the third position command enables discrimination to determine which of static friction and Coulomb friction of the drive system has changed.

The diagnostic method according to the present embodiment includes changing the position of the mechanical structure 2 being the diagnostic target with drive unit 6 based on an acceleration command generated based on a LOGSS (Log Swept Sine) signal. The diagnostic method further includes calculating an impulse response based on the acceleration command and the measured acceleration of the mechanical structure 2 measured by the accelerometer. The diagnostic method further includes analyzing at least one of the linear characteristic and the nonlinear characteristic relating to the mechanical structure 2 based on the impulse response. The diagnostic method further includes diagnosing the mechanical structure 2 based on the at least one of the linear characteristic and the nonlinear characteristic relating to the mechanical structure 2. This configuration enables recognition of a sign of the deterioration state of the mechanical structure 2 as the state of the mechanical structure 2.

The present embodiment also includes regulating parameters of a simulator for a mechanical structure, which is constructed in consideration of the friction characteristic and/or the nonlinear spring characteristic, based on change of a friction characteristic and/or change of a nonlinear spring characteristic acquired by the diagnostic method to construct the simulator in accordance with the state of the apparatus, and recognizing a sign of the deterioration state by recognizing the rate of change of the parameters.

The method described in the embodiment and the like may be stored and distributed in a storage medium, such as a magnetic disk, an optical disk, and a semiconductor memory, as a program (software) executable with a computer. The storage medium is not limited to a medium for distribution, but includes a storage medium, such as a magnetic disk and a semiconductor memory, provided inside the computer or an apparatus connected via a network. The program stored in the medium includes a setting program constructing software to be executed by the computer in the computer. The software includes not only an execution program but also a table and a data structure. The computer achieving the present system executes the processing described above by reading the program stored in the storage medium and being controlled by the software with respect to the operation thereof. The software may be constructed by the computer using the setting program. The program is, for example, a simulator constructed based on parameters acquired from the diagnostic system of the embodiment.

Specifically, a simulator corresponding to the state of the mechanical structure may be constructed by regulating parameters in the simulator for the mechanical structure based on change of the friction characteristic and change of the nonlinear spring characteristic acquired by the diagnostic method according to the embodiment. In addition, a sign of the deterioration state of the mechanical structure 2 may be recognized based on the rate of change of the friction characteristic and the rate of change of the nonlinear spring characteristic acquired by the diagnostic method according to the embodiment. In other words, the diagnostic method according to the present embodiment may be used as a technique relating to digital twin.

EXAMPLES

Figure 15:
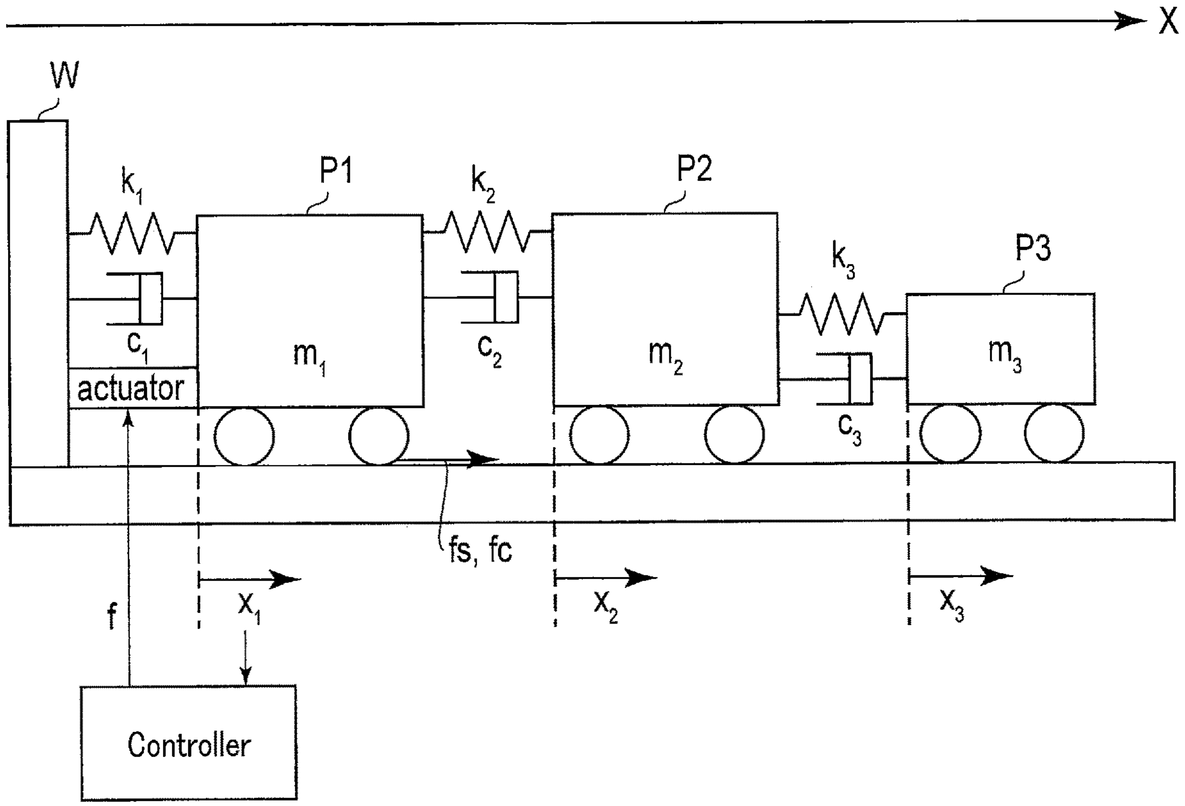
FIG. 15 is a schematic diagram of a mechanical structure corresponding to an inertial system used for verification of the diagnostic method for a mechanical structure according to the embodiment.

The diagnostic method according to the embodiment described above will be verified hereinafter by simulation using a predetermined inertial system. The simulation was performed using ordinary software capable of reproducing the predetermined inertial system. FIG. 15 is a schematic diagram of the inertial system used for verification of the diagnostic method for a mechanical structure according to the embodiment. In the inertial system illustrated in FIG. 15, a mass point P1, a mass point P2, and a mass point P3 are arranged in order along the X axis direction. The mass point P1 is connected to an actuator configured to move the mass point P1 in the X axis direction, and connected to a wall W via a spring and a damper. The mass point P1 is connected to the mass point P2 via a spring and a damper, and the mass point P2 is connected to the mass point P3 via a spring and a damper. In the inertial system illustrated in FIG. 15, the spring characteristics of all the springs are linear spring characteristics (first inertial system to test the linear spring characteristic).

The actuator to which the mass point P1 is connected is subjected to feedback control by the controller 4. The controller 4 subjects the actuator to feedback control based on the velocity and the position of the mass point P1, and uses any one of the first position command to the third position command as a position command. In the LOGSS signal expressed by the expressions (1) to (3), the sampling frequency fs was set to 4000 Hz, the LOGSS signal length N was set to $2^{14}$, and q was set to ¾ (see FIG. 8H). Primary delay is introduced into the actuator as the actuator characteristic. The motion equation of the inertial system illustrated in FIG. 15 is expressed as in expressions (11) to (13).

$$m_1\ddot{x}1+(k_1+k_2)x_1-k_2x_2+(c_1+c_2)\dot{x}_1-c_2\dot{x}_2=f \tag{11}$$

$$m_2\ddot{x}_2-k_2x_2+(k_2+k_3)x_2-k_3x_3-c_2\ddot{x}_1+(c_2+c_3)\dot{x}_2-c_3\dot{x}_3=0 \tag{12}$$

$$m_3\ddot{x}_3-k_3x_2+k_3x_3-c_3\dot{x}_2+c_3\dot{x}_3=0 \tag{13}$$

In the expressions, $x_i$ is position coordinates of the mass point $P_i$, $m_i$ is mass of the mass point $P_i$, $k_i$ is a spring constant of the spring connected to the wall W side of the mass point i, and $c_i$ is a constant of the damper connected to the wall W side of the mass point i (i=1, 2, 3). In the present example, $m_1$ was set to 0.2 [kg], $m_2$ was set to 0.15 [kg], and $m_3$ was set to 0.05 [kg]. As the frequency $f_i$ of the spring connected to the wall W side of the mass point i, $f_1$ was set to 60 [Hz], $f_2$ was set to 70 [Hz], and $f_3$ was set to 150 [Hz]. As the damping coefficient $\zeta_i$ connected to the wall W side of the mass point i, $\zeta_i$ was set to 0.2, $\zeta_2$ was set to 0.2, and $\zeta_3$ was set to 0.01. f is the force corresponding to the position command input from the controller 4.

Figure 16:
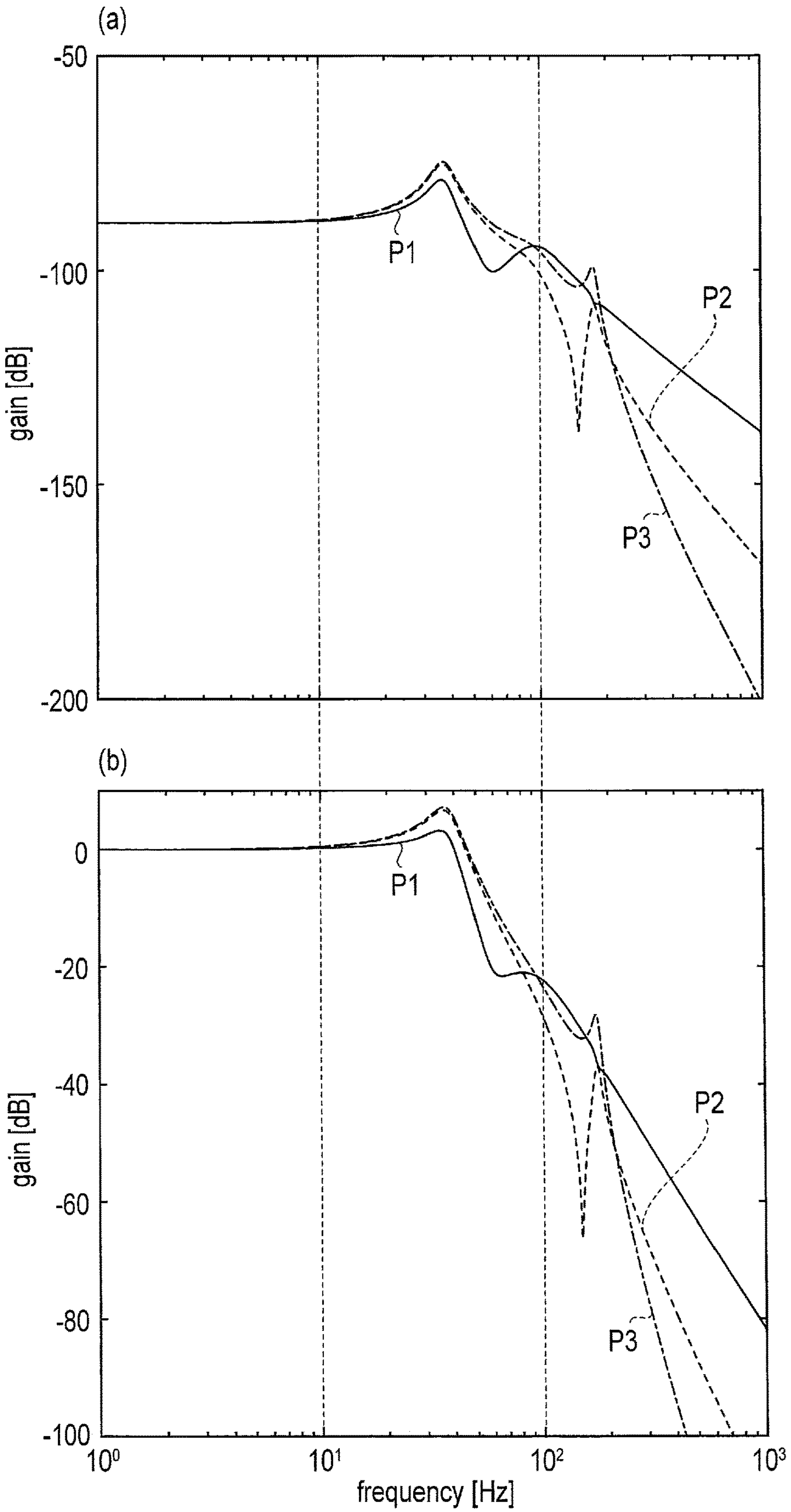
FIG. 16 is a diagram illustrating transmission characteristics of the inertial system used for verification of the diagnostic method for a mechanical structure according to the embodiment, in which (a) illustrates transmission characteristics of the mechanical structure, and (b) illustrates transmission characteristics of the mechanical structure including a control system.

FIG. 16 illustrates the transmission characteristics of the inertial system illustrated in FIG. 15. The vertical axis indicates the gain [dB], and the horizontal axis indicates the frequency [Hz] in a logarithmic scale. In FIG. 16, (a) illustrates transmission characteristics of the mechanical structure, and (b) illustrates transmission characteristics of the mechanical structure including the control system. As illustrated in FIG. 16, the resonant characteristic in the present inertial system is 37.0 Hz when the phases of 2-inertial system are in-phase, 95.8 Hz when the phases of the 2-inertial system are shifted, and 177.8 Hz when the 3-inertial system resonates. In the present example, it is possible to test whether the diagnostic system 1 according to the embodiment is capable of evaluating each of static friction and Coulomb friction by changing each of the static friction fs and the Coulomb friction (dynamic friction) fc as the friction characteristic of the mass point P1 (drive system) connected to the actuator. The measuring points of acceleration are the mass points.

In addition, to test the case where the spring characteristic of the resonant structure is a nonlinear spring characteristic, an inertial system (second inertial system to test the nonlinear spring characteristic) using the nonlinear spring characteristic expressed by an expression (14) as the spring characteristic (spring constant $k_3$) of the resonant structure was used as the inertial system illustrated in FIG. 15.

$$k_3 x + k_3^{\alpha 2} x^2 \mathrm{sgn}(x) + k_3^{\alpha 3} x^3 \tag{14}$$

In the expression, $\alpha_2$ is an order of a coefficient of the second-order term of the nonlinear spring characteristic, and $\alpha_3$ is an order of a coefficient of the third-order term of the nonlinear spring characteristic. For this reason, the motion equation of the inertial system used in the test example 6 is expressed by expressions (15) to (17).

$$m_1\ddot{x}_1 + (k_1 + k_2)x_1 - k_2 x_2 + (c_1 + c_2)\dot{x}_1 - c_2\dot{x}_2 = f \tag{15}$$

$$m_2\ddot{x}_2 - k_2 x_2 + (k_2 + k_3)x_2 - k_3 x_3 - c_2\ddot{x}_1 + (c_2 + c_3)\dot{x}_2 - c_3\dot{x}_3 + k_3^{\alpha 2}(x_2 - x_3)^2 \mathrm{sgn}(x_2 - x_3) + k_3^{\alpha 3}(x_2 - x_3)^3 = 0 \tag{16}$$

$$m_3\ddot{x}_3 - k_3 x_2 + k_3 x_3 - c_3\ddot{x}_2 + c_3\ddot{x}_3 - k_3^{\alpha 2}(x_2 - x_3)^2 \mathrm{sgn}(x_2 - x_3) - k_3^{\alpha 3}(x_2 - x_3)^3 = 0 \tag{17}$$

The following is an explanation of test example 1 to test example 9. The test conditions of the test example 1 to test example 9 are illustrated in Table 1 and Table 2 below.

TABLE 1

| Test Example | Type of Inertial System | Evaluation Method | Position Command | Static Friction | Coulomb Friction |
|---|---|---|---|---|---|
| 1 | First inertial system | First evaluation method | Third position command | Exist (0.1/0.2) | Exist (0.02) |
| 2 | Third inertial system | Third evaluation method | Third position command | Exist (0.1/0.2) | Exist (0.02) |
| 3 | First inertial system | First evaluation method | Third position command | Exist (0.1) | Exist (0.06) |
| 4-1 | First inertial system | First evaluation method | Third position command | Exist (0.1) | Exist (0.02/0.06) |
| 4-2 | First inertial system | Third evaluation method | Third position command | Exist (0.1) | Exist (0.02/0.06) |
| 5 | First inertial system | Third evaluation method | First position command | Exist (0.1/0.2) | Exist (0.02) |
| 6 | Second inertial system | First evaluation method | First position command | Not exist | Not exist |
| 7 | Second inertial system | Third evaluation method | First position command | Not exist | Not exist |
| 8 | Second inertial system | Second evaluation method | First position command | Not exist | Not exist |
| 9 | Second inertial system | Second evaluation method | First position command | Not exist | Not exist |

TABLE 2

| | | | Evaluated Section [second] | | | |
|---|---|---|---|---|---|---|
| | SC | | | Nonlinear | | |
| TE | ($k_3$) | DE | Linear | 2nd-order | 4th-order | 6th-order |
| 1 | L | NLC | — | | 2.90-3.92 | |
| 2 | L | NLC | — | 3.65-3.80 | 3.55-3.65 | 3.40-3.50 |
| 3 | L | LC and NLC | 0-1.02<br>— | | 2.90-3.92 | |
| 4-1 | L | NLC | — | 3.65-3.80 | 3.55-3.65 | 3.40-3.50 |
| 4-2 | L | NLC | — | 3.65-3.80 | 3.55-3.65 | 3.40-3.50 |
| 5 | L | NLC | — | 3.65-3.80 | 3.55-3.65 | 3.40-3.50 |
| 6 | NL | NLC | — | | 2.90-3.92 | |
| 7 | NL | NLC | — | 3.65-3.80 | 3.55-3.65 | 3.40-3.50 |
| 8 | NL | LC | 0-0.8, 3.996-4.096 | — | — | — |
| 9 | NL | LC | 0-0.8, 3.996-4.096 | — | — | — |

TE: Test example
SC: Spring characteristic
DE: Detail of evaluation
L: Linear
NL: Nonlinear
LC: Linear characteristic
NLC: Nonlinear characteristic

Test Example 1

In the test example 1, the first inertial system was used, and the static friction characteristic of the drive system was changed. In the test example 1, the third position command was used as the position command, and the first power evaluation method was used as the power evaluation method. The section width in the first power evaluation method was set to a tap corresponding to 1.024 seconds (number of points of FFT: $2^{12}$, sampling frequency: 4000 Hz). In the first power evaluation method, a section from 2.90 to 3.92 seconds of the impulse response was used as the section to evaluate the nonlinear characteristic (distortion characteristic).

Figure 17:
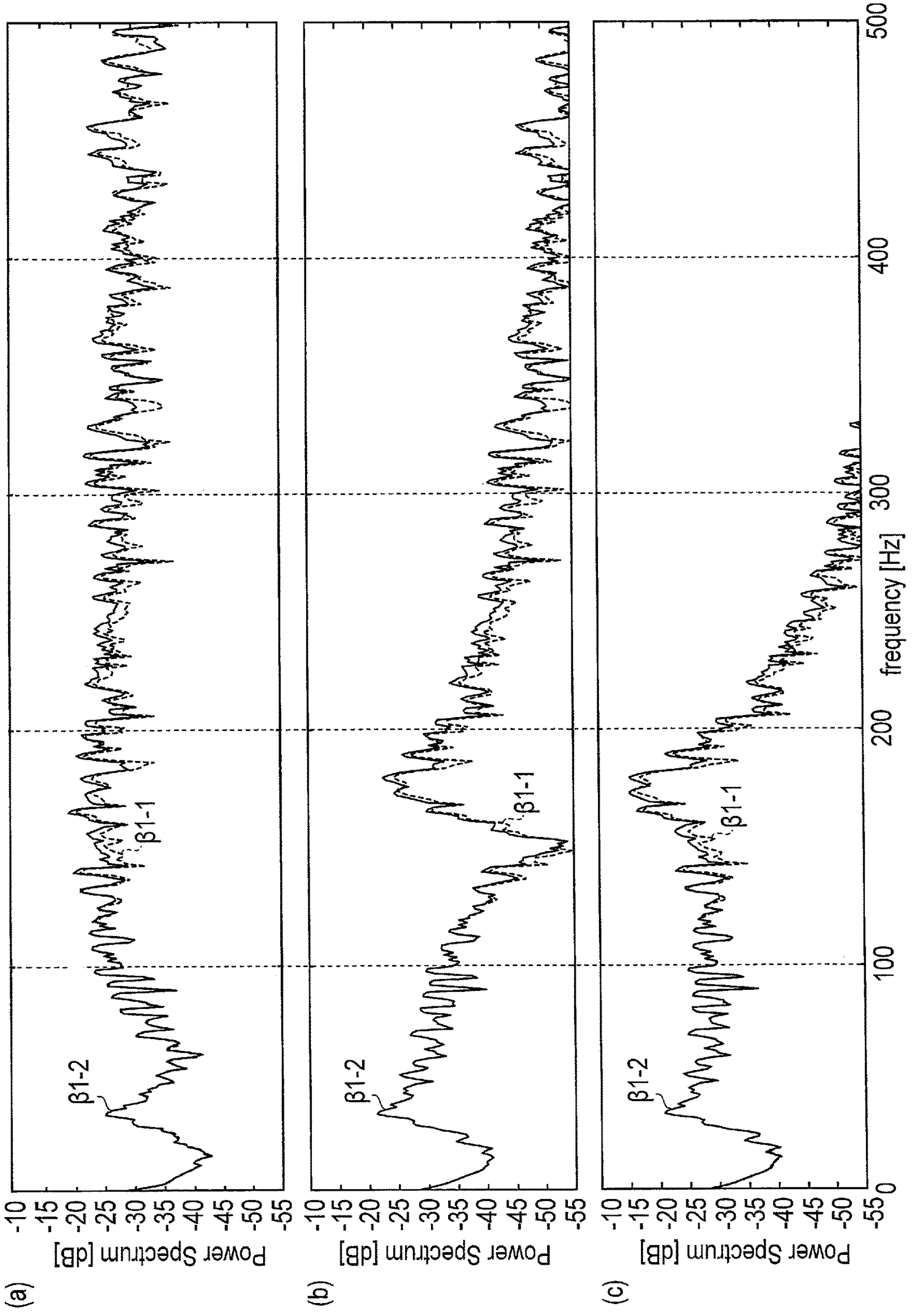
FIG. 17 is a diagram illustrating results of evaluation of the inertial system of a test example 1 in which static friction is set to a predetermined value by the diagnostic method for a mechanical structure according to the embodiment, in which (a) illustrates evaluation results for a mass point P1, (b) illustrates evaluation results for a mass point P2, and (c) illustrates evaluation results for a mass point P3.

FIG. 17 illustrates evaluation results for the respective mass points in the test example 1. The vertical axis indicates the power spectrum [dB], and the horizontal axis indicates the frequency [Hz]. In FIG. 17, (a) illustrates evaluation results for the mass point P1, (b) illustrates evaluation results for the mass point P2, and (c) illustrates evaluation results for the mass point P3. A line β1-1 in FIG. 17 indicates an evaluation result corresponding to the nonlinear characteristic (distortion characteristic) in the case where 0.1 [kg·m/s$^2$] was set as the static friction, and a line β1-2 in FIG. 17 indicates an evaluation result corresponding to the nonlinear characteristic (distortion characteristic) in the case where 0.2 [kg·m/s$^2$] was set as the static friction. In both of the lines, 0.02 [kg·m/s$^2$] was set as the Coulomb friction. As is clear from FIG. 17, it was verified that the nonlinear characteristic (distortion characteristic) of the mass point P1 (drive system) changed, with change of the static friction from 0.1 [kg·m/s$^2$] to 0.2 [kg·m/s$^2$].

Test Example 2

In the test example 2, the first inertial system was used, and the static friction characteristic of the drive system was changed. In the test example 2, the third position command was used as the position command, and the third power evaluation method was used as the power evaluation method. In the third power evaluation method, a section from 3.65 to 3.80 seconds of the impulse response was used for the second-order distortion characteristic, a section from 3.55 to 3.65 seconds of the impulse response was used for the fourth-order distortion characteristic, and a section from 3.40 to 3.50 seconds of the impulse response was used for the sixth-order distortion characteristic, as the section to evaluate the nonlinear characteristic.

Figure 18:
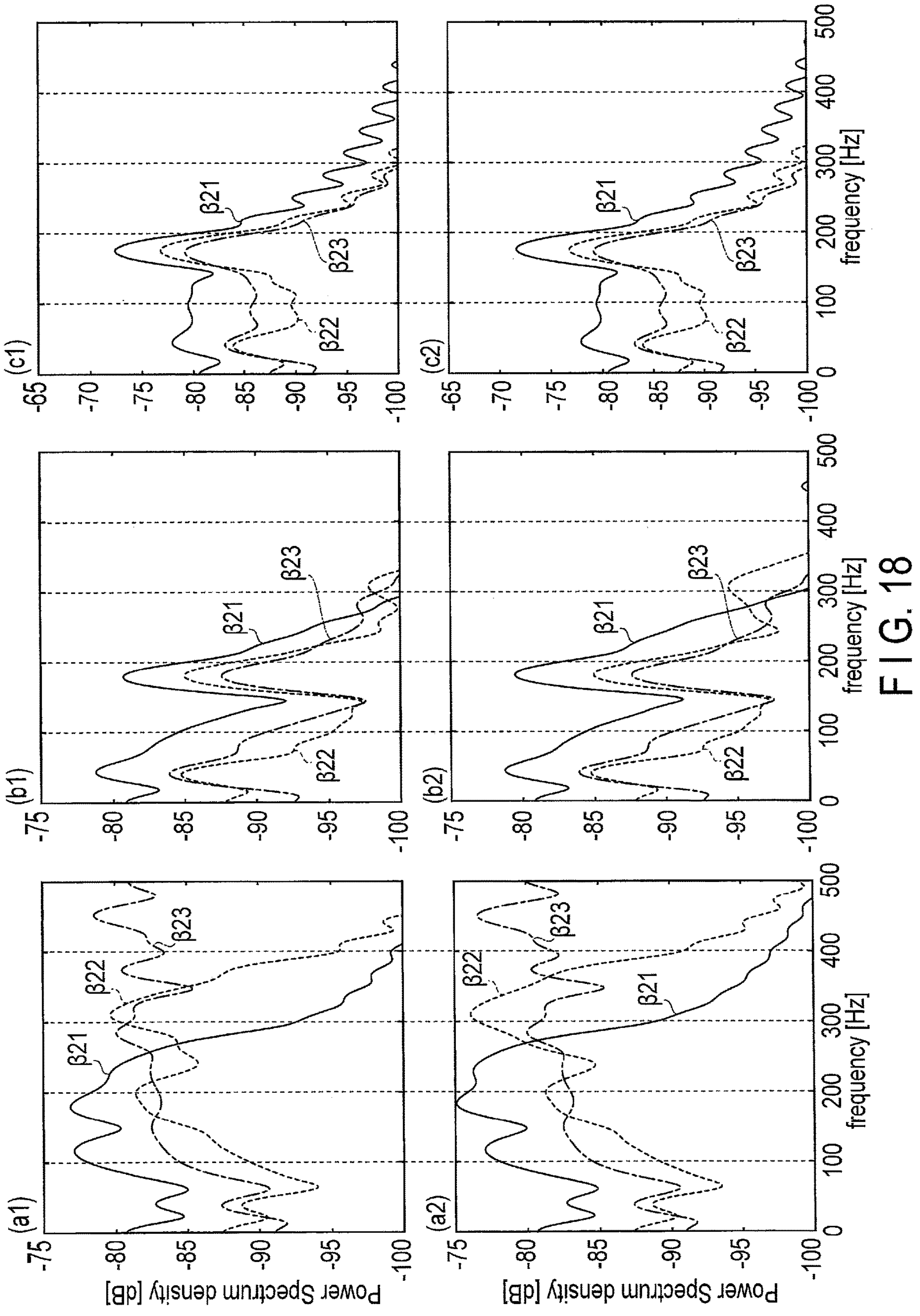
FIG. 18 is a diagram illustrating results of evaluation of the inertial system of a test example 2 in which static friction is set to a predetermined value by the diagnostic method for a mechanical structure according to the embodiment, in which (a1) and (a2) illustrate evaluation results for the mass point P1, (b1) and (b2) illustrate evaluation results for the mass point P2, and (c1) and (c3) illustrate evaluation results for the mass point P3.

FIG. 18 illustrates evaluation results for the respective mass points in the test example 2. The vertical axis indicates the power spectrum density [dB], and the horizontal axis indicates the frequency [Hz]. In FIG. 18, the upper part illustrates evaluation results in the case where 0.1 [kg·m/s$^2$] was set as the static friction, and the lower part illustrates evaluation results in the case where 0.2 [kg·m/s$^2$] was set as the static friction. In both of the parts, 0.02 [kg·m/s$^2$] was set as the Coulomb friction. In FIGS. 18, (a1) and (a2) illustrate valuation results for the mass point P1, (b1) and (b2) illustrate valuation results for the mass point P2, and (c1) and (c2) illustrate evaluation results for the mass point P3. A line β21 in FIG. 18 indicates an evaluation result corresponding to the second-order distortion characteristic, a line β22 indicates an evaluation result corresponding to the fourth-order distortion characteristic, and a line β23 indicates an evaluation result corresponding to the sixth-order distortion characteristic. As is clear from FIG. 18, it was verified that the nonlinear characteristic of the mass point P1 (drive system) changed, with change of the static friction from 0.1 [kg·m/s$^2$] to 0.2 [kg·m/s$^2$]. In particular, in the test example 2, change of second-order distortion was clearly verified in the frequency region in the vicinity of 177 Hz corresponding to the resonant structure.

Test Example 3

In the test example 3, test was performed under the same conditions as those of the test example 1, except that the Coulomb friction characteristic of the drive system was set, power evaluation was performed using the whole section (0 to 4.10 seconds) of the calculated impulse response, and a section from 0 to 1.02 seconds of the impulse response was used as a section to evaluate the linear characteristic.

Figure 19A:
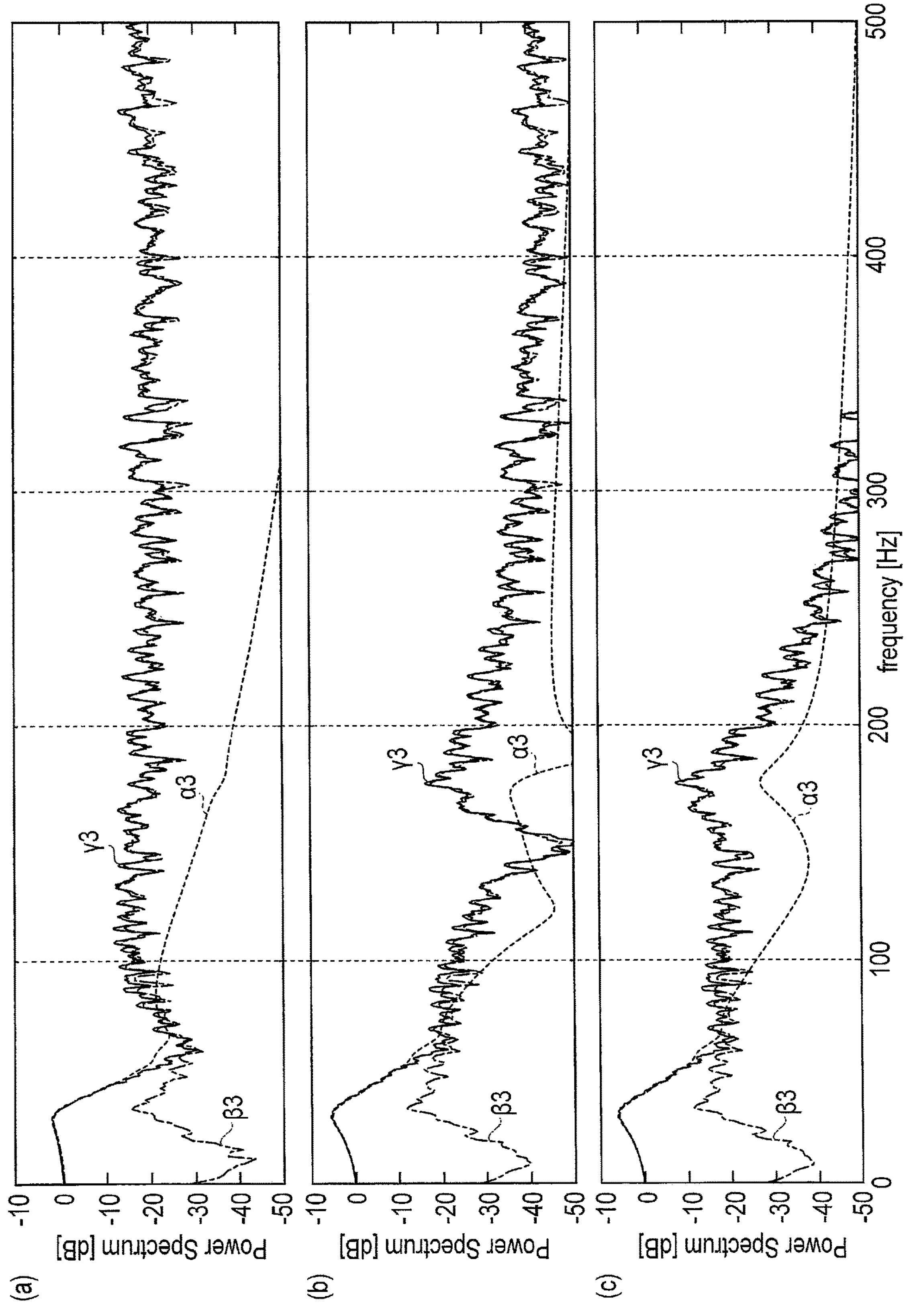
FIG. 19A is a diagram illustrating results of evaluation of the inertial system of a test example 3 in which Coulomb friction is set to a predetermined value by the diagnostic method for a mechanical structure according to the embodiment, in which (a) illustrates evaluation results for the mass point P1, (b) illustrates evaluation results for the mass point P2, and (c) illustrates evaluation results for the mass point P3.
Figure 19B:
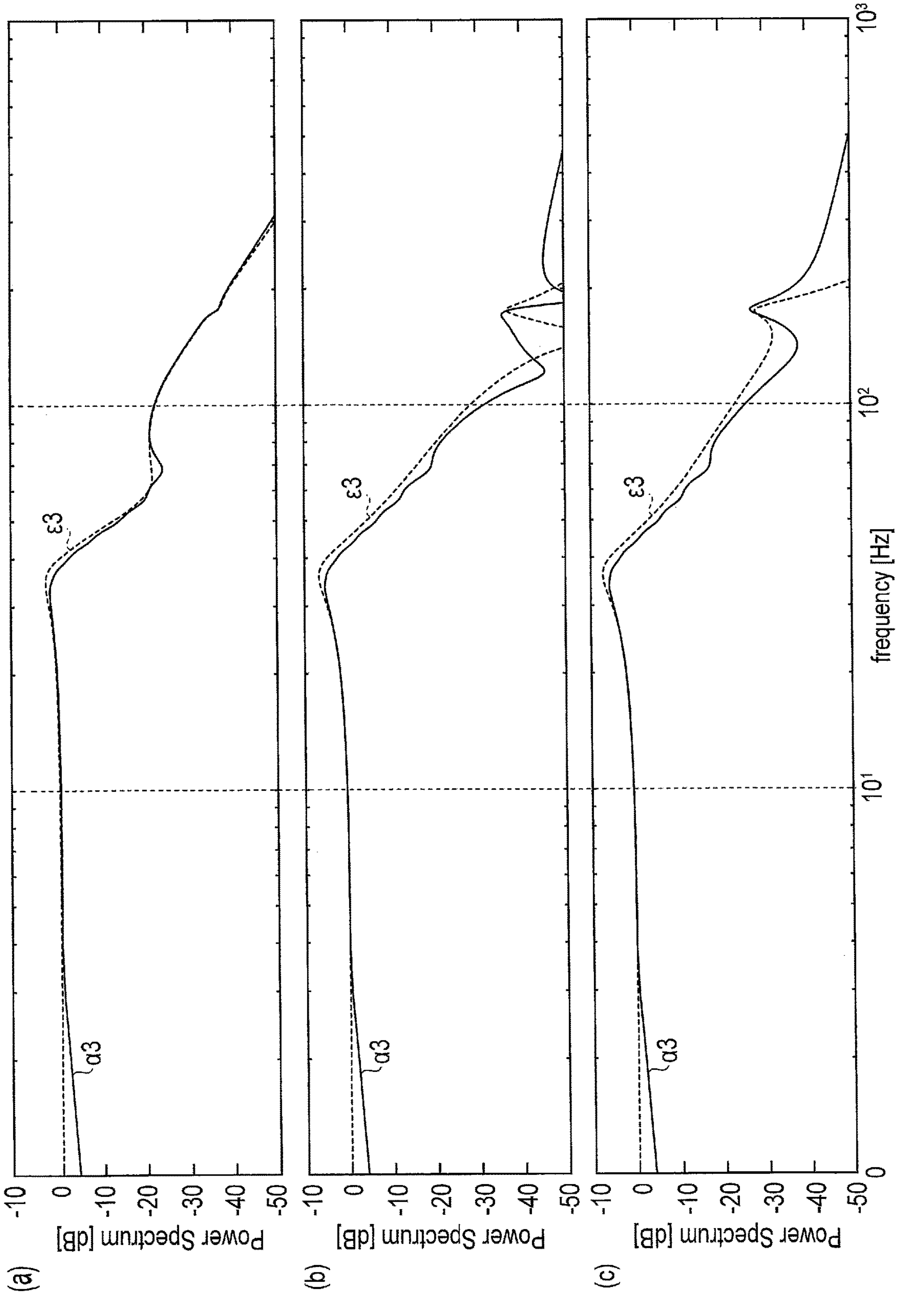
FIG. 19B is a diagram illustrating the inertial system of the test example 3 in which Coulomb friction is set to a predetermined value, in which (a) illustrates comparison between the linear characteristic and the transmission characteristic of the mass point P1, (b) illustrates comparison between the linear characteristic and the transmission characteristic of the mass point P2, and (c) illustrates comparison between the linear characteristic and the transmission characteristic of the mass point P3.

FIG. 19A and FIG. 19B illustrate evaluation results for the respective mass points in the test example 3. The vertical axis indicates the power spectrum [dB], and the horizontal axis indicates the frequency [Hz] (in a logarithmic scale in FIG. 19B). In each of FIG. 19A and FIG. 19B, (a) illustrates evaluation results for the mass point P1, (b) illustrates evaluation results for the mass point P2, and (c) illustrates evaluation results for the mass point P3. FIG. 19A and FIG. 19B illustrate evaluation results in the case where 0.06 [kg·m/s$^2$] was set as the Coulomb friction. In both of them, 0.1 [kg·m/s$^2$] was set as the static friction. A line α3 indicates an evaluation result corresponding to the linear characteristic, and a line 33 indicates an evaluation result corresponding to the nonlinear characteristic (distortion characteristic). A line γ3 indicates an evaluation result corresponding to the whole section of the impulse response. A line ε3 indicates the transmission characteristic of the inertial system illustrated in FIG. 16.

As illustrated in FIG. 19A, using the diagnostic method according to the embodiment enables separation of the excitation component in the resonant characteristic in the case where 3-inertial system resonate (177.8 Hz) into a linear component (line α3) and a nonlinear component (line β3), in the mass point P2 and the mass point P3. When the whole section of the impulse response is evaluated, an influence of the nonlinear characteristic is largely influenced on the power evaluation result, as illustrated by the line γ. By contrast, separating the linear component (line α3) enables proper evaluation of the linear component (line α3) without being influenced by the nonlinear component (line β3). In addition, as illustrated in FIG. 19B, it was verified that the diagnostic method according to the embodiment enabled estimation of the transmission characteristic of the mechanical structure with high accuracy even in the case where an influence of the friction characteristic was large (in the case where the Coulomb friction was 0.06 [kg·m/s$^2$]). As described above, the diagnostic method according to the embodiment enables proper evaluation of an influence of the linear component on the deterioration state of the mechanical structure by excluding an influence of the nonlinear component. In addition, the diagnostic method according to the embodiment enables proper evaluation of an influence of change of the friction characteristic on the deterioration state of the mechanical structure by monitoring (chronologically tracking) the power change of the nonlinear component.

Test Examples 4-1 and 4-2

In the test example 4-1, test was performed under the same conditions as those of the test example 1, except that the Coulomb friction characteristic of the drive system was changed. In the test example 4-2, test was performed under the same conditions as those of the test example 2, except that the Coulomb friction characteristic of the drive system was changed.

FIG. 20 illustrates evaluation results for the respective mass points in the test example 4-1. The vertical axis indicates the power spectrum [dB], and the horizontal axis indicates the frequency [Hz]. In FIG. 20, (a) illustrates evaluation results for the mass point P1, (b) illustrates evaluation results for the mass point P2, and (c) illustrates evaluation results for the mass point P3. A line β411 in FIG. 20 indicates an evaluation result corresponding to the nonlinear characteristic (distortion characteristic) in the case where 0.02 [kg·m/s$^2$] was set as the Coulomb friction, and a line β412 in FIG. 20 indicates an evaluation result corresponding to the nonlinear characteristic (distortion characteristic) in the case where 0.06 [kg·m/s$^2$] was set as the Coulomb friction. In FIG. 20, 0.1 [kg·m/s$^2$] was set as the static friction.

Figure 21:
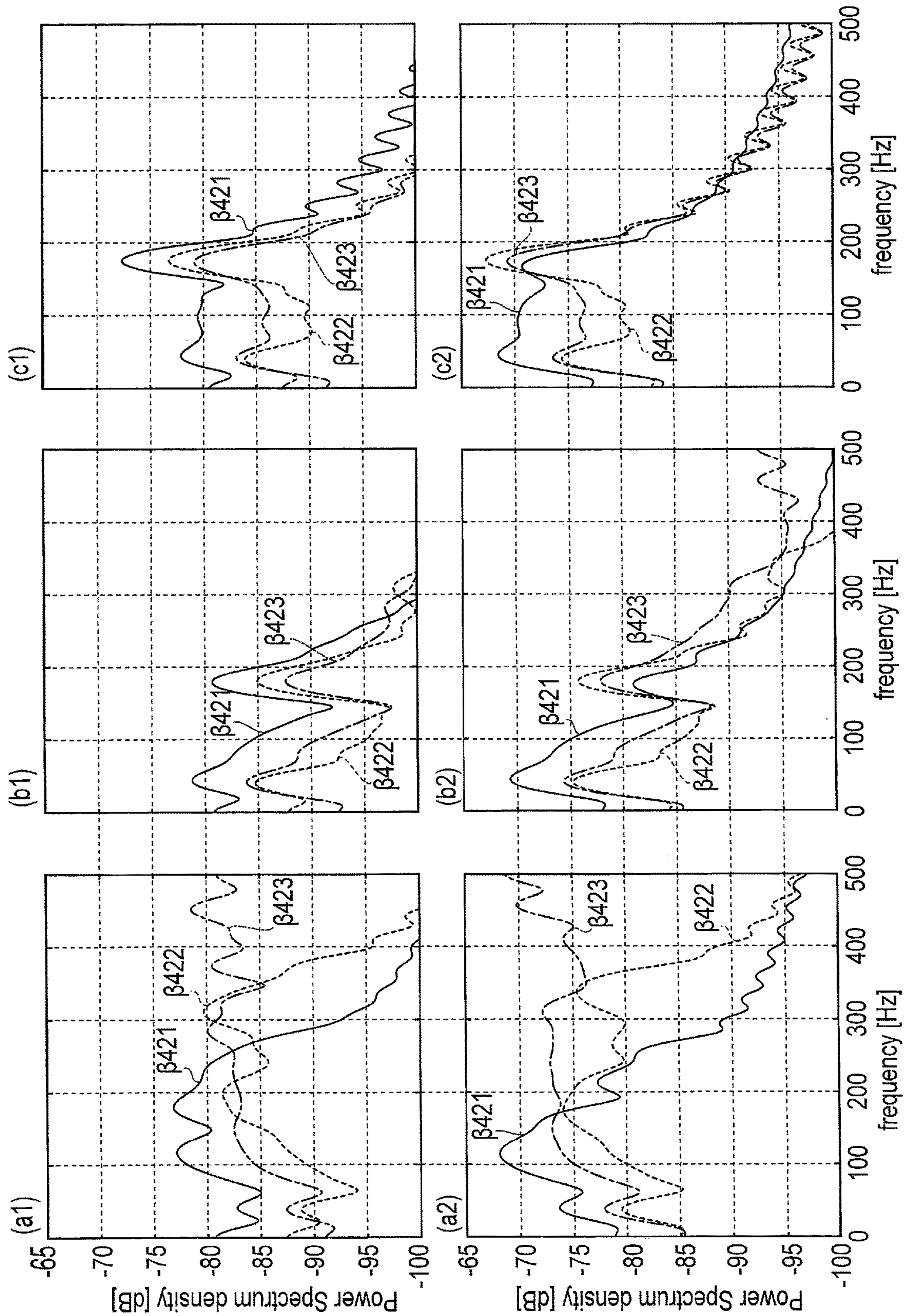
FIG. 21 is a diagram illustrating results of evaluation of the inertial system of a test example 4-2 in which Coulomb friction is set to a predetermined value by the diagnostic method for a mechanical structure according to the embodiment, in which (a1) and (a2) illustrate evaluation results for the mass point P1, (b1) and (b2) illustrate evaluation results for the mass point P2, and (c1) and (c2) illustrates evaluation results for the mass point P3.

FIG. 21 illustrates evaluation results for the respective mass points in the test example 4-2. The vertical axis indicates the power spectrum density [dB], and the horizontal axis indicates the frequency [Hz]. The upper part in FIG. 21 illustrates evaluation results in the case where 0.02 [kg·m/s$^2$] was set as the Coulomb friction, and the lower part in FIG. 21 illustrates evaluation results in the case where 0.06 [kg·m/s$^2$] was set as the Coulomb friction. In FIGS. 21, (a1) and (a2) illustrate evaluation results for the mass point P1, (b1) and (b2) illustrate evaluation results for the mass point P2, and (c1) and (c2) illustrate evaluation results for the mass point P3. A line β421 indicates an evaluation result corresponding to the second-order distortion characteristic, a line β422 indicates an evaluation result corresponding to the fourth-order distortion characteristic, and a line β423 indicates an evaluation result corresponding to the sixth-order distortion characteristic.

In each of the test examples 4-1 and 4-2, it was verified that the power of the nonlinear characteristic of the mass point P3 increased by approximately 10 dB in the vicinity of the resonance frequency (177.8 Hz) of the resonant structure, with change of the Coulomb friction from 0.02 [kg·m/s$^2$] to 0.06 [kg·m/s$^2$]. In addition, also in the mass point P2, increase of the power of the nonlinear characteristic (distortion characteristic) was verified in correspondence with the increase amount of the power of the mass point P3. This structure enables indirect measurement of power change caused by the friction characteristic in the vicinity of the resonance frequency of the resonant structure of the mass point P3, by measuring the acceleration of the mass point P2, even in the case where, for example, no accelerometer can be attached to the mass point P3 due to the problem of the space or the like. In addition, in the test example 4-2, power change of the nonlinear characteristic (distortion characteristic) was verified in a broad frequency region (80 Hz to 200 Hz in the present example) including the resonance frequency of the resonant structure, in the mass point P1.

In view of the test examples 1 to 4 described above, with respect to the static friction, the power does not change in the vicinity of the resonance frequency of the nonlinear characteristic (distortion characteristic), and the distortion characteristic of the drive system changes over a broad frequency region in the vicinity of the resonance frequency of the resonant structure, in the resonant structure part (mass point P3) and a part (mass point P2) connected on the wall W side beyond the resonant structure part. For this reason, when the static friction characteristic changes, only the power of the nonlinear characteristic (distortion characteristic) of the drive system changes over a broad frequency region in the vicinity of the resonance frequency of the resonant structure. With respect to the Coulomb friction, in the resonant structure part and the part connected on the wall W side beyond the resonant structure part, the power in the vicinity of the resonance frequency of the nonlinear characteristic (distortion characteristic) changes. In addition, the nonlinear characteristic (distortion characteristic) of the drive system changes over a broad frequency region, which includes the resonance frequency of the resonant structure. Accordingly, the validity of the flow relating to the friction characteristic in the second diagnostic method illustrated in FIG. 13 was verified.

Test Example 5

In the test example 5, test was performed under the same conditions as those of the test example 2, except that the first position command was used as the position command.

FIG. 22 illustrates evaluation results for the mass point P1 in the test example 5. The vertical axis indicates the power spectrum density [dB], and the horizontal axis indicates the frequency [Hz]. In FIG. 22, (a) indicates evaluation results in the case where 0.1 [kg·m/s$^2$] was set as the static friction, and (b) indicates evaluation results in the case where 0.2 [kg·m/s$^2$] was set as the static friction. In both of them, 0.02 [kg·m/s$^2$] was set as the Coulomb friction. A line β51 indicates an evaluation result corresponding to the second-order distortion characteristic, a line β52 indicates an evaluation result corresponding to the fourth-order distortion characteristic, and a line β53 indicates an evaluation result corresponding to the sixth-order distortion characteristic. As is clear from FIG. 22, it was verified that no change occurred in the evaluation result, even when the static friction is changed from 0.1 [kg·m/s$^2$] to 0.2 [kg·m/s$^2$].

By contrast, although it is not described as a test example, when test was performed under the same conditions as those of the test example 5 except that the Coulomb friction was changed instead of the static friction, the same evaluation results as those of the test example 4 were acquired. Accordingly, evaluation of the static friction and the Coulomb friction can be properly performed by performing determination with the first position command and determination with the third position command. Accordingly, the validity of the flow relating to the friction characteristic in the third diagnostic method illustrated in FIG. 14 was verified.

Test Example 6

In the test example 6, test was performed under the same conditions as those of the test example 1, except that the second inertial system was used, the first position command was used as the position command, and neither static friction nor static friction were set.

Figure 23:
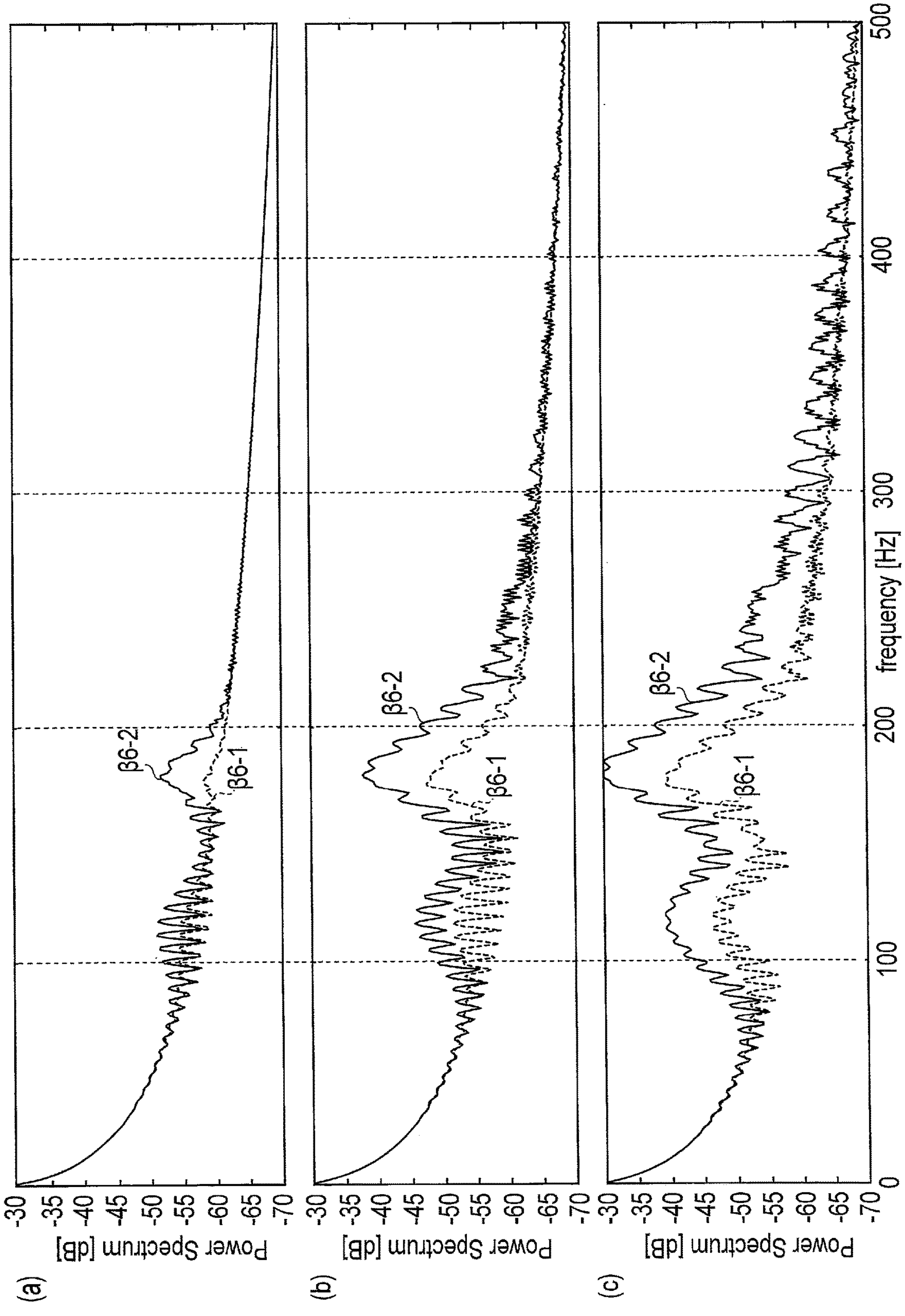
FIG. 23 is a diagram illustrating results of evaluation of the inertial system of a test example 6 in which a nonlinear spring characteristic is set to a predetermined value by the diagnostic method for a mechanical structure according to the embodiment, in which (a) illustrates evaluation results for the mass point P1, (b) illustrates evaluation results for the mass point P2, and (c) illustrates evaluation results for the mass point P3.

FIG. 23 illustrates evaluation results for the respective mass points in the test example 6. The vertical axis indicates the power spectrum [dB], and the horizontal axis indicates the frequency [Hz]. In FIG. 23, (a) illustrates evaluation results for the mass point P1, (b) illustrates evaluation results for the mass point P2, and (c) illustrates evaluation results for the mass point P3. A line β6-1 in FIG. 23 indicates an evaluation result corresponding to the nonlinear characteristic (distortion characteristic) in the case where 1.9 was set as $\alpha_2$, and a line β6-2 in FIG. 23 indicates an evaluation result corresponding to the nonlinear characteristic (distortion characteristic) in the case where 2.0 was set as $\alpha_2$. In the test example 6, $\alpha_3$ was set to 0.0. By setting the values as described above, nonlinear change of the attachment rigidity of the resonant structure is simulated.

As is clear from FIG. 23, it was verified that the nonlinear characteristics (distortion characteristics) of the mass point P2 and the mass point P3 changed in the vicinity of the resonance frequency (177.8 Hz) of the resonant structure, with change of $\alpha_2$ of the nonlinear spring characteristic from 2.0 to 1.9.

Test Example 7

In the test example 7, test was performed under the same conditions as those of the test example 2, except that the second inertial system was used, neither static friction nor static friction were set, the first position command was used as the position command, and the nonlinear spring characteristic was changed.

Figure 24:
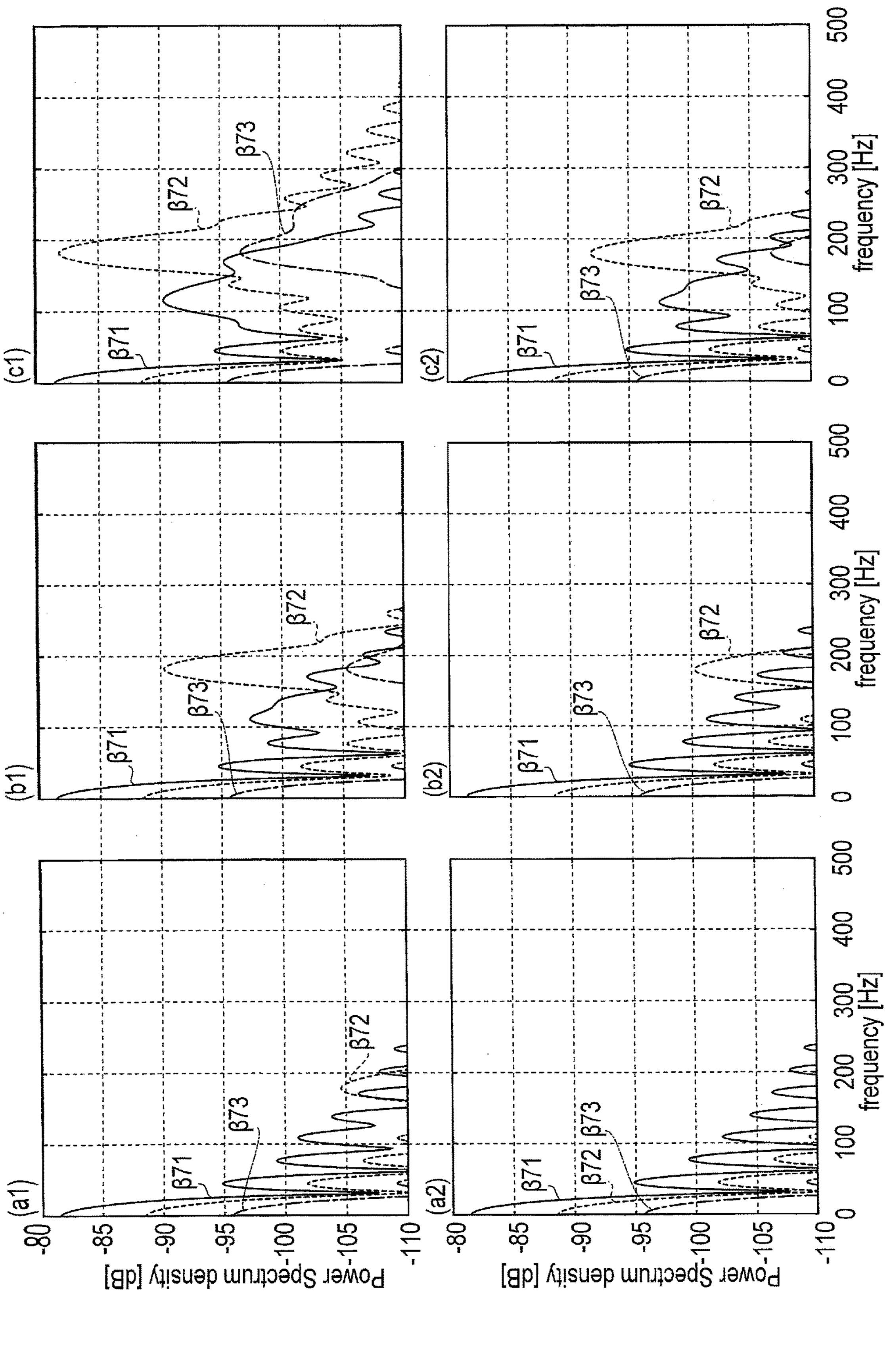
FIG. 24 is a diagram illustrating results of evaluation of the inertial system of a test example 7 in which a nonlinear spring characteristic is set to a predetermined value by the diagnostic method for a mechanical structure according to the embodiment, in which (a1) and (a2) illustrate evaluation results for the mass point P1, (b1) and (b2) illustrate evaluation results for the mass point P2, and (c1) and (c2) illustrate evaluation results of the mass point P3.

FIG. 24 illustrates evaluation results for the respective mass points in the test example 7. The vertical axis indicates the power spectrum density [dB], and the horizontal axis indicates the frequency [Hz]. The upper part in FIG. 24 illustrates evaluation results in the case where 2.0 was set as $\alpha_2$ of the nonlinear spring characteristic, and the lower part in FIG. 24 illustrates evaluation results in the case where 1.8 was set as $\alpha_2$ of the nonlinear spring characteristic. In FIGS. 24, (a1) and (a2) illustrate valuation results for the mass point P1, (b1) and (b2) illustrate valuation results for the mass point P2, and (c1) and (c2) illustrate evaluation results for the mass point P3. A line β71 indicates an evaluation result corresponding to the second-order distortion characteristic, a line β72 indicates an evaluation result corresponding to the fourth-order distortion characteristic, and a line β73 indicates an evaluation result corresponding to the sixth-order distortion characteristic.

As is clear from FIG. 24, it was verified that the nonlinear characteristics (distortion characteristics) of the mass point P2 and the mass point P3 changed in the vicinity of the resonance frequency (177.8 Hz) of the resonant structure, with change of $\alpha_2$ of the nonlinear spring characteristic from 2.0 to 1.8. In particular, it was verified that the fourth-order distortion characteristic changed largely.

Test Example 8

In the test example 8, the second inertial system was used. In the test example 8, the first position command was used as the position command, and the second power evaluation method was used as the power evaluation method. In the test example, 2.0 was set as $\alpha_2$ of the nonlinear spring characteristic, and 0.0 was set as $\alpha_3$ of the nonlinear spring characteristic. In the second power evaluation method, a section from 0 to 0.8 seconds and a section from 3.996 to 4.096 seconds of the impulse response were used as sections to evaluate the linear characteristic.

Figure 25:
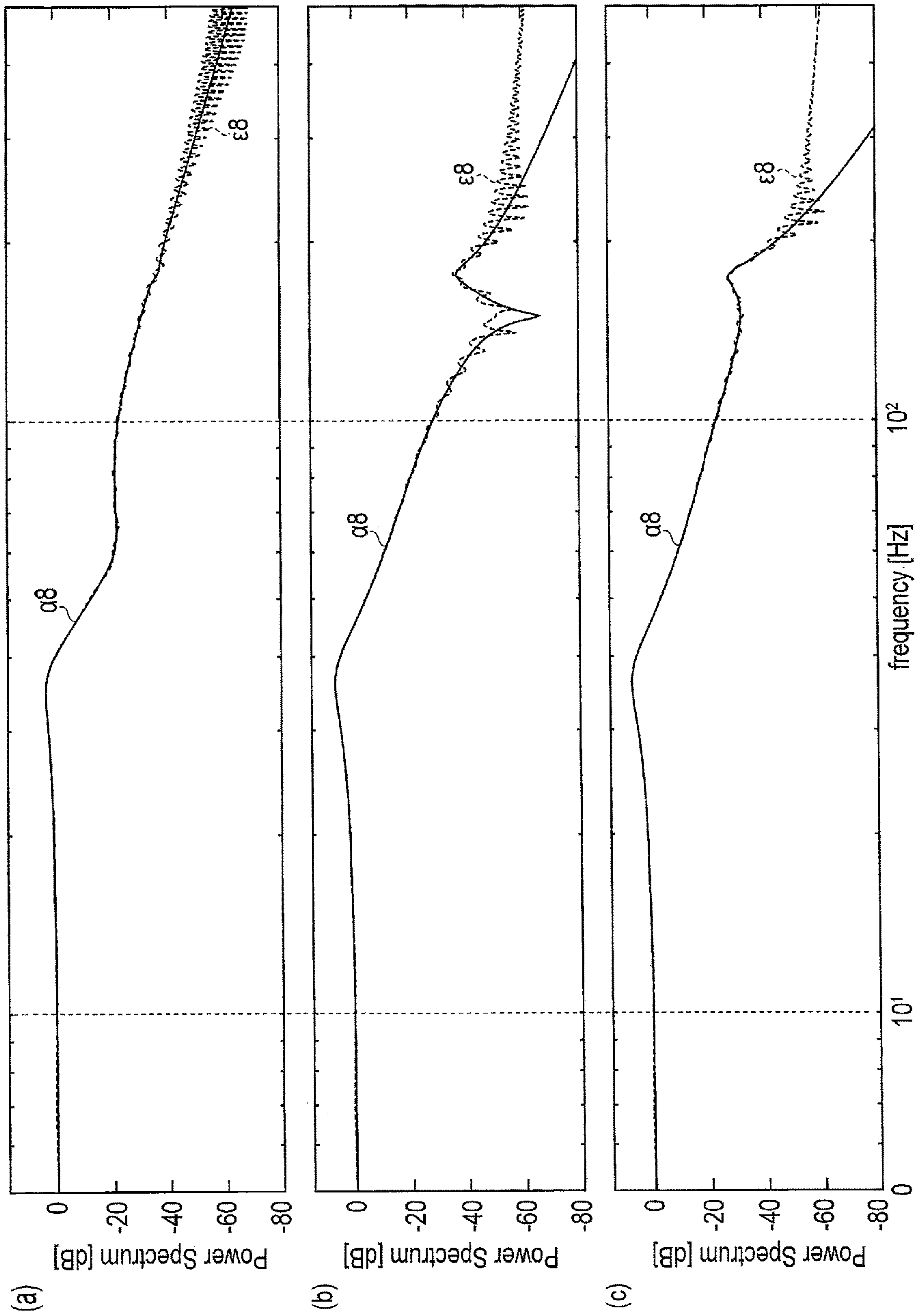
FIG. 25 is a diagram illustrating results of evaluation of the inertial system of a test example 8 in which nonlinear spring characteristic is set to a predetermined value by the diagnostic method for a mechanical structure according to the embodiment, in which (a) illustrates evaluation results for the mass point P1, (b) illustrates evaluation results for the mass point P2, and (c) illustrates evaluation results for the mass point P3.

FIG. 25 illustrates evaluation results for the respective mass points in the test example 8. The vertical axis indicates the power spectrum [dB], and the horizontal axis indicates the frequency [Hz] in a logarithmic scale. In FIG. 25, (a) illustrates evaluation results for the mass point P1, (b) illustrates evaluation results for the mass point P2, and (c) illustrates evaluation results for the mass point P3. A line $\alpha$8 indicates an evaluation result corresponding to the linear characteristic, and a line $\varepsilon$8 indicates the transmission characteristic of the inertial system illustrated in FIG. 16. As is clear from FIG. 25, the diagnostic method according to the embodiment enables proper separation of the linear component even under the condition (in the case where the nonlinear spring characteristic $\alpha_2$ is 2.0) in which the nonlinear characteristic is high. In other words, it was verified that the diagnostic method according to the embodiment enabled proper separation of the nonlinear characteristic (distortion characteristic).

The test examples 6 to 8 described above verified that change of the nonlinear spring characteristic of the mechanical structure could be verified by monitoring the power of the component of the nonlinear characteristic (distortion characteristic). Performing such monitoring enables diagnosis of the deterioration state or the like of a fastening part of the resonant structure by, for example, checking the ratio (contribution) of the nonlinear characteristic in the spring rigidity of the resonant structure part. Accordingly, the validity of the flow relating to the nonlinear spring characteristic in the first to the third diagnostic methods illustrated in FIG. 12 to FIG. 14 was verified. The results similar to the results of the test examples 6 to 8 are acquired also in the case of using the second position command and the third position command.

Test Example 9

In the test example 9, the second inertial system was used, and the damping coefficient $\zeta$ of the resonant structure was changed. In the test example 9, the first position command was used as the position command, and the second power evaluation method was used as the power evaluation method. In the test example, 2.0 was set as $\alpha_2$ of the nonlinear spring characteristic, and 0.0 was set as $\alpha_3$ of the nonlinear spring characteristic. In the second power evaluation method, a section from 0 to 0.8 seconds and a section from 3.996 to 4.096 seconds of the impulse response were used as sections to evaluate the linear characteristic.

Figure 26:
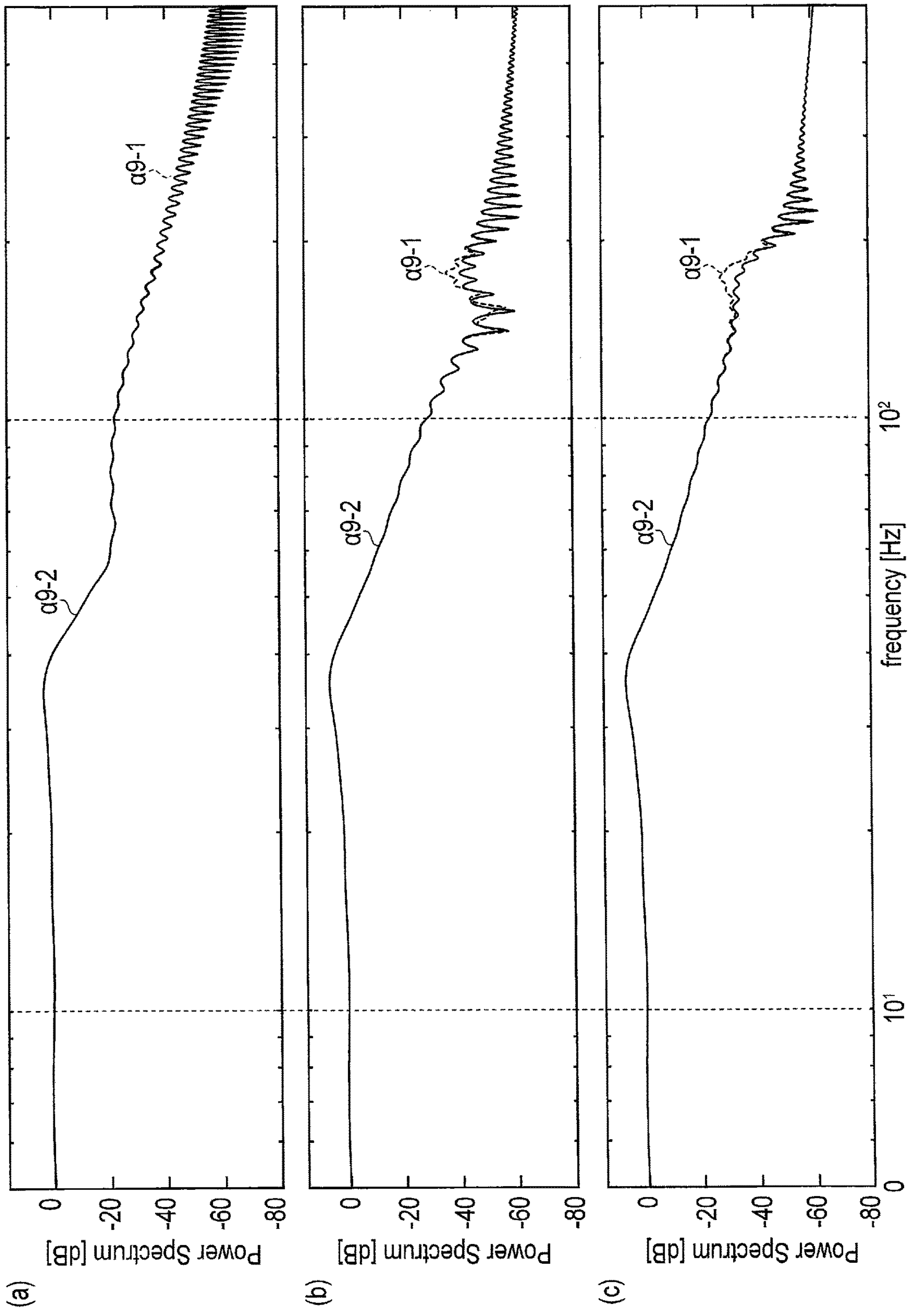
FIG. 26 is a diagram illustrating results of evaluation of the inertial system of a test example 9 in which a damping coefficient is set to a predetermined value by the diagnostic method for a mechanical structure according to the embodiment, in which (a) illustrates evaluation results for the mass point P1, (b) illustrates evaluation results for the mass point P2, and (c) illustrates evaluation results for the mass point P3.

FIG. 26 illustrates evaluation results for the respective mass points in the test example 9. The vertical axis indicates the power spectrum [dB], and the horizontal axis indicates the frequency [Hz] in a logarithmic scale. In FIG. 26, (a) illustrates evaluation results for the mass point P1, (b) illustrates evaluation results for the mass point P2, and (c) illustrates evaluation results for the mass point P3. A line $\alpha$9-1 in FIG. 26 indicates an evaluation result in the case where 0.01 was set as the damping coefficient $\zeta$, and a line $\alpha$9-2 in FIG. 26 indicates an evaluation result in the case where 0.05 was set as the damping coefficient $\zeta$.

With change of the damping coefficient $\zeta$ from 0.01 to 0.05, the peak changed in the vicinity of the resonance frequency (177.8 Hz) of the resonant structure in each of the mass point P2 and the mass point P3. This proves that the component of the linear component also changes when the damping coefficient of the resonant structure changes. Accordingly, the diagnostic method according to the present embodiment enables proper diagnosis of the deterioration state of the resonant structure by separating the component of the linear characteristic from the component of the nonlinear characteristic.

The diagnostic method according to at least one of these embodiments changes the position of the mechanical structure 2 being the diagnostic target with the drive unit 6 based on the acceleration command generated based on the LOGSS (Log Swept Sine) signal. The diagnostic method calculates an impulse response based on the acceleration command and the measured acceleration of the mechanical structure 2 measured by the accelerometer, and analyzes at least one of the linear characteristic and the nonlinear characteristic relating the mechanical structure 2. The diagnostic method diagnoses the mechanical structure 2 based on the at least one of the linear characteristic and the nonlinear characteristic relating the mechanical structure 2. This configuration provides a diagnostic method, a diagnostic apparatus, and a diagnostic program capable of recognizing the state of the mechanical structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnostic method comprising:

changing a position of a mechanical structure to be diagnosed with a drive unit based on an acceleration command, the acceleration command being generated based on a log swept sine (LOGSS) signal;

calculating an impulse response based on the acceleration command and measured acceleration of the mechanical structure, the measured acceleration being measured by an accelerometer, the impulse response including a first section in which a linear characteristic of the mechanical structure appears and a second section in which a nonlinear characteristic of the mechanical structure appears, the first section being separated from the second section;

analyzing the linear characteristic of the mechanical structure from the first section of the impulse response;

analyzing the nonlinear characteristic of the mechanical structure from the second section of the impulse response; and diagnosing the mechanical structure based on analysis results of the linear characteristic and the nonlinear characteristic of the mechanical structure.

2. The diagnostic method according to claim 1, further comprising:

processing the LOGSS signal by filtering causing no phase delay; and generating the acceleration command based on the processed LOGSS signal.

3. The diagnostic method according to claim 1, further comprising calculating a position command of the mechanical structure based on the acceleration command, wherein the changing the position of the mechanical structure comprises applying vibration to the mechanical structure based on the position command.

4. The diagnostic method according to claim 3, further comprising processing the position command by filtering causing no phase delay, wherein the changing the position of the mechanical structure comprises changing the position of the mechanical structure based on the processed position command.

5. The diagnostic method according to claim 3, further comprising setting a signal level of the acceleration command of each of a tap number and subsequent tap numbers to 0 based on a phenomenon that a difference in signal level between the LOGSS signal and the acceleration command processed by filtering causing no phase delay is equal to or larger than a threshold, the tap number having a difference in signal level equal to or larger than the threshold.

6. The diagnostic method according to claim 5, further comprising converging a velocity command of the mechanical structure to 0 based on a phenomenon that the signal level of the acceleration command has been set to 0.

7. The diagnostic method according to claim 1, wherein the measured acceleration is measured at at least one of the mechanical structure and a position between the mechanical structure and the drive unit.

8. The diagnostic method according to claim 1, wherein the analyzing the linear characteristic of the mechanical structure comprises evaluating the linear characteristic of the mechanical structure in the impulse response by performing fast Fourier transform for the first section of the impulse response and the analyzing the nonlinear characteristic of the mechanical structure comprises evaluating the nonlinear characteristic of the mechanical structure in the impulse response by performing fast Fourier transform for the second section of the impulse response, the first and second sections having tap lengths shorter than a tap length of the LOGSS signal.

9. The diagnostic method according to claim 1, wherein the analyzing the linear characteristic of the mechanical structure comprises evaluating the linear characteristic of the mechanical structure in the impulse response by performing fast Fourier transform for the first section of the impulse response, the first section extending from time before time corresponding to a peak value of the impulse response to time at which residual vibration of the mechanical structure converges.

10. The diagnostic method according to claim 1, wherein the analyzing the nonlinear characteristic of the mechanical structure comprises evaluating the nonlinear characteristic of the mechanical structure in the impulse response based on a spectrogram calculated from the second section of the impulse response.

11. The diagnostic method according to claim 1, wherein the diagnosing the mechanical structure comprises:

determining whether the linear characteristic of the mechanical structure has changed from a standard linear characteristic in a vicinity of resonance frequency of the mechanical structure;

diagnosing that at least one of a linear spring characteristic and a damping characteristic of the mechanical structure has changed, when the linear characteristic changed from the standard linear characteristic beyond a first threshold; and determining change of the nonlinear characteristic of the mechanical structure, when the linear characteristic has changed from the standard linear characteristic by a value equal to or smaller than the first threshold.

12. The diagnostic method according to claim 11, wherein the diagnosing the mechanical structure comprises:

determining, when the linear characteristic has changed from the standard linear characteristic by a value equal to or smaller than the first threshold, whether power of the nonlinear characteristic of the mechanical structure has changed from a first standard nonlinear characteristic being a standard nonlinear characteristic of the mechanical structure in the vicinity of the resonance frequency of the mechanical structure; and diagnosing that no abnormality has occurred in the mechanical structure, when the nonlinear characteristic has changed from the first standard nonlinear characteristic by a value equal to or smaller than a second threshold.

13. The diagnostic method according to claim 12, wherein the diagnosing the mechanical structure comprises:

determining, when the nonlinear characteristic of the mechanical structure has changed from the first standard nonlinear characteristic beyond the second threshold, whether the nonlinear characteristic in a vicinity of the drive unit has changed from a second standard nonlinear characteristic being a standard nonlinear characteristic in the vicinity of the drive unit;

diagnosing that a friction characteristic of the drive unit has changed, when the nonlinear characteristic in the vicinity of the drive unit has changed from the second standard nonlinear characteristic beyond a third threshold; and diagnosing that a nonlinear spring characteristic of the mechanical structure has changed, when the nonlinear characteristic in the vicinity of the drive unit has changed from the second standard nonlinear characteristic by a value equal to or smaller than the third threshold.

14. The diagnostic method according to claim 12, wherein the diagnosing the mechanical structure comprises:

determining, when the nonlinear characteristic of the mechanical structure has changed from the first standard nonlinear characteristic by the value equal to or smaller than the first standard nonlinear characteristic, whether the nonlinear characteristic in the vicinity of the drive unit has changed from a third standard nonlinear characteristic being a standard nonlinear characteristic in the vicinity of the drive unit;

diagnosing that a friction characteristic of the drive unit has changed, when the nonlinear characteristic in the vicinity of the drive unit has changed from the third standard nonlinear characteristic beyond a fourth threshold; and diagnosing that no abnormality has occurred in the mechanical structure, when the nonlinear characteristic in the vicinity of the drive unit has changed from the third standard nonlinear characteristic by a value equal to or smaller than the fourth threshold.

15. The diagnostic method according to claim 1, wherein the acceleration command includes a first acceleration command and a second acceleration command different from the first acceleration command, the impulse response includes a first impulse response calculated based on the first acceleration command and a second impulse response calculated based on the second acceleration command, and the analyzing the linear characteristic of the mechanical structure comprises analyzing the linear characteristic of the mechanical structure based on both of the first impulse response and the second impulse response, and the analyzing the nonlinear characteristic of the mechanical structure comprises analyzing the nonlinear characteristic of the mechanical structure based on both of the first impulse response and the second impulse response.

16. A diagnostic apparatus comprising:

a controller configured to:

calculate an impulse response based on an acceleration command and measured acceleration of a mechanical structure, the acceleration command being generated based on a log swept sine (LOGSS) signal, the measured acceleration being measured when a position of the mechanical structure to be diagnosed is changed based on the acceleration command, the impulse response including a first section in which a linear characteristic of the mechanical structure appears and a second section in which a nonlinear characteristic of the mechanical structure appears, the first section being separated from the second section;

analyze the linear characteristic of the mechanical structure from the first section of the impulse response;

analyze the nonlinear characteristic of the mechanical structure from the second section of the impulse response; and diagnose the mechanical structure based on analysis results of the linear characteristic and the nonlinear characteristic of the mechanical structure.

17. A non-transitory computer readable medium including computer executable instructions, wherein the instructions, when executed by a processor, cause the processor to perform a method comprising:

controlling a drive unit based on an acceleration command to change a position of a mechanical structure to be diagnosed, the acceleration command being generated based on a log swept sine (LOGSS) signal;

calculating an impulse response based on the acceleration command and measured acceleration of the mechanical structure, the measured acceleration being measured by an accelerometer, the impulse response including a first section in which a linear characteristic of the mechanical structure appears and a second section in which a nonlinear characteristic of the mechanical structure appears, the first section being separated from the second section;

analyzing the linear characteristic of the mechanical structure from the first section of the impulse response of the mechanical structure;

analyzing the nonlinear characteristic of the mechanical structure from the second section of the impulse response; and diagnosing the mechanical structure based on analysis results of the linear characteristic and the nonlinear characteristic of the mechanical structure.

* * * * *